(12) United States Patent
Hamer et al.

(10) Patent No.: US 7,146,333 B2
(45) Date of Patent: Dec. 5, 2006

(54) REPORT GENERATOR FOR ALLOWING A FINANCIAL ENTITY TO MONITOR SECURITIES CLASS ACTION LAWSUITS AND POTENTIAL MONETARY CLAIMS RESULTING THEREFROM

(76) Inventors: Patricia A. Hamer, 246 Childs Ave., Drexel Hill, PA (US) 19026; Maxine S. Goldman, 2520 Shelmire Ave., Philadelphia, PA (US) 19152

( * ) Notice: Subject to any disclaimer, the term of this patent is extended or adjusted under 35 U.S.C. 154(b) by 348 days.

(21) Appl. No.: 10/641,578

(22) Filed: Aug. 14, 2003

(65) Prior Publication Data

US 2004/0205010 A1    Oct. 14, 2004

(51) Int. Cl.
*G06Q 40/00* (2006.01)
(52) U.S. Cl. .................... 705/36 R; 705/35
(58) Field of Classification Search ........... 705/35, 705/36 R
See application file for complete search history.

(56) References Cited

U.S. PATENT DOCUMENTS

| | | | |
|---|---|---|---|
| 6,330,551 B1 | 12/2001 | Burchetta et al. | |
| 2001/0034731 A1 | 10/2001 | Simmons | |
| 2001/0037204 A1 | 11/2001 | Horn et al. | |
| 2002/0035528 A1 | 3/2002 | Simpson et al. | |
| 2002/0143562 A1* | 10/2002 | Lawrence | 705/1 |
| 2003/0028782 A1 | 2/2003 | Grundfest | |
| 2004/0019496 A1 | 1/2004 | Angle et al. | |

FOREIGN PATENT DOCUMENTS

JP    2002049713 A  *  2/2002

OTHER PUBLICATIONS

Business Editors. "Unify Corp. Issues Letter to Stockholders". Business Wire. New York: Jun. 19, 2001 p. 1.*

Institutional Shareholder Services, Securities Class Action Tracking, Copyright © 2003, printout from web site: http://www.issproxy.com/institutional/analytics/scas/tracking.asp, printout date: Aug. 6, 2003, initial posting date is unknown, 2 pages.

(Continued)

*Primary Examiner*—Lalita M. Hamilton
(74) *Attorney, Agent, or Firm*—Akin Gump Strauss Hauer & Feld, LLP

(57) ABSTRACT

Reports are automatically created that allow a financial entity to review and track potential monetary claims resulting from securities class action lawsuits for securities purchased or acquired by the financial entity. To create the reports, a first database of transaction activity for the financial entity is accessed. The transaction activity includes an identification of each security purchased or acquired, and the date of each purchase or acquisition. A second database of securities class action lawsuits is accessed. The second database includes for each lawsuit an identification of all securities associated with the class action lawsuit, and the class period of the lawsuit. The transaction activity of the financial entity is automatically compared with the securities class action lawsuits in the second database, and any securities purchased or acquired by the financial entity during the class period that are associated with an entered securities class action lawsuit are identified. The identified securities may provide a potential monetary claim for the financial entity. A report is then automatically created of at least the lawsuits that may provide a potential monetary claim for the financial entity based on the transaction activity of the financial entity. The report also includes estimated market loss and eligible loss information, as well as any actions recommended to be taken by the financial entity regarding the lawsuits.

24 Claims, 41 Drawing Sheets

OTHER PUBLICATIONS

Institutional Shareholder Services, Brochure for: Security Class Action Services, brochure dated Jun. 2003, printout from Institutional Shareholder Services web site, printout date: Aug. 2003, initial posting date is unknown, 2 pages.

Verteris® Portfolio Monitor, Copyright © 2003, Verteris Corporation, printout from web site: http://www.verteris.com/portfolioMonitor.html, printout date: Aug. 14, 2003, initial posting date is unknown, 1 page.

Verteris Corporation Press Release: New Federal Securities Class Action Filings Declined Slightly in Q2, Aug. 13, 2003, printout from Yahoo Finance web site: http://biz.yahoo.com/pz/030813/43859.html, printout date Aug. 15, 2003, initial posting date is unknown, 3 pages.

Verteris Claims Manager, Copyright © 2003, Verteris Corporation, printout from web site: http://www.verteris.com/claimsManager.html, printout date: Mar. 9, 2004, initial posting date in unknown, 2 pages.

Verteris Case Monitor, Copyright © 2003, Verteris Corporation, printout from web site: http://www.verteris.com/caseMonitor.html, printout date: Mar. 9, 2004, initial posting date is unknown, 2 pages.

Claims Compensation Bureau, Inc., Services and Pricing. Printout from web site: http://www.claimscompensation.com/classactionservices.htm, printout date: Jun. 30, 2003, 2 pages.

Claims Compensation Bureau, Inc., Client Success Stories. Printout from web site: http://www.claimscompensation.com/classactionsuccess.htm, printout date: Jun. 30, 2003, 2 pages.

Feiler, J. "Firm Recovers Funds From Class-Action Lawsuits," Article about Claims Compensation Bureau, Oct. 29, 2001, printout from web site: http://philadelphia.bizjournals.com/philadelphia/stories/2001/10/29/focus2.html, printout date: Jun. 30, 2003, 4 pages.

Home page of Inventor Responsibility Support Services, Inc. (IRSS), Copyright © 2002, IRSS, Inc., printout from web site: http://www.irss.ws/, printout date: Feb. 11, 2004, initial posting date is unknown, 2 pages.

About IRSS, Investor Responsibility Support Services, Inc., printout from web site: http://www.irss.ws/about.html, printout date: Feb. 11, 2004, initial posting date is unknown, 2 pages.

Contact IRSS, Investor Responsibility Support Services, Inc., printout from web site: http://www.irss.ws/contact.html, printout date: Feb. 11, 2004, initial posting date is unknown, 1 page.

Securities Fraud Class Actions—Frequently Asked Questions, posted on Schubert & Reed LLP web site, web site address: http://www.schubert-reed.com/faq.html, printout date: Jun. 30, 2003, 6 pages.

Addendum I—Securities Monitoring & Litigation Policy, posted on Iowa Public Employees' Retirement System (IPERS) web site, date of posted document: Sep. 2002, web site addess: http://www.ipers.org/pdfs/investments/secmonlit.pdf, initial posting date in unknown, 4 pages.

Securities Class Action Clearinghouse, Stanford Law School, printout from web site: http: securities.stanford.edu/research.htlm, Mar. 18, 2002, 9 pages.

Class Action Notices, printout from The Notice Company web site: http://www.notice.com/coordination.html, Copyright © 2000-2003, The Notice Company, Inc., initial posting date is unknown, 2 pages.

Magenta One Home Page, Services, and Frequently Asked Questions, Copyright Magenta One Ltd., Updated Dec. 1, 2004, printouts from Magenta One web sites, printout date: Arp. 16, 2004, 5 pages.

* cited by examiner

BR&B
*Barrack, Rodos & Bacine*

[Logout]

Please Enter Report Parameters start_date *(in YYYY-MM-DD format)*
1998-01-01 end_date *(in YYYY-MM-DD format)*
2003-08-01

BR&B
*Barrack, Rodos & Bacine*

Results from 1 to 6  | Web Page ∨ | Download |

Nirvana Pension Fund

|  | Search | Logout |

Class Action Activity Filings Report (By Company Name)

Requested for Information with the Search Dates from 1998-01-01 to 2003-08-01

| Lead Motion Due | Company Name | Ticker | Cusip/ISIN | Class Begin | Class End | Expanded Class Begin | Expanded Class End | Trade Status |
|---|---|---|---|---|---|---|---|---|
| 06/15/1998 | Cendant Corporation | CD | 151313103 | 05/31/1995 | 08/28/1998 | | | ACT |
| 08/12/2003 | Guidant Corporation Policy | GDT | 401698105 | 08/17/2001 | 06/12/2003 | 06/23/1999 | 06/12/2003 | ACTPFT |

FIGURE 4

Nirvana Pension Fund

Class Action Activity Filings Report (By Company Name)

Requested for Information with the Search Dates from 1998-01-01 to 2003-08-01

| Lead Motion Due | Company Name | Ticker | Cusip/ISIN | Class Begin | Class End | Expanded Class Begin | Expanded Class End | Trade Status | Estimated Mrkt Loss | Profit | Action Recommended |
|---|---|---|---|---|---|---|---|---|---|---|---|
| 06/15/1998 | Cendant Corporation | CD | 151313103 | 05/31/1995 | 08/28/1998 | | | ACT | $237,300.00 | | NPR |
| 06/12/2003 | Guidant Corporation | GDT | 401698105 | 08/17/2001 | 08/12/2003 | 06/23/1999 | 06/12/2003 | ACTPFT | | Profit N | |
| 03/07/2000 | Policy Management Systems Corp | PMS | 731108106 | 10/22/1998 | 02/10/2000 | | | ACT | $361,870.00 | | NCF |
| 07/01/2003 | Regeneron Pharmaceuticals, Inc. | REGN | 75886F107 | 03/28/2000 | 03/30/2003 | | | ACT | $758,400.00 | | M |
| 04/23/2001 | Stan Lee Media, Inc. | SLEE | 85285P101 | 08/23/1999 | 12/18/2000 | | | ACT | $133,125.00 | | NCF |
| 09/29/2003 | Stellent, Inc. | STEL | 85856W105 | 10/02/2001 | 04/01/2002 | | | NACT | | | N |

*Barrack, Rodos & Bacine*

FIGURE 5

Nirvana Pension Fund

Class Action Activity Filings Report (By Company Name)

Requested for Information with the Search Dates from 1998-01-01 to 2003-08-01

| Lead Motion Due | Company Name | Ticker | Cusip/ISIN | Class Begin | Class End | Expanded Class Begin | Expanded Class End | Trade Status | Estimated Mrkt Loss | Profit | Action Recommended |
|---|---|---|---|---|---|---|---|---|---|---|---|
| 06/15/1998 | Cendant Corporation | CD | 151313103 | 05/31/1995 | 08/28/1998 | | | ACT | $237,300.00 | | NRR |
| 08/12/2003 | Guidant Corporation | GDT | 401698105 | 08/17/2001 | 06/12/2003 | 06/23/1999 | 06/12/2003 | ACTPFT | | Profit | N |
| 03/07/2000 | Policy Management Systems Corp | PMS | 731108106 | 10/22/1998 | 02/10/2000 | | | ACT | $361,870.00 | | NCF |
| 07/01/2003 | Regeneron Pharmaceuticals, Inc. | REGN | 75886F107 | 03/28/2000 | 03/30/2003 | | | ACT | $758,400.00 | | M |
| 04/23/2001 | Stan Lee Media, Inc. | SLEE | 85285P101 | 08/23/1999 | 12/18/2000 | | | ACT | $133,125.00 | | NCF |
| 09/29/2003 | Stellent, Inc. | STEL | 85856W105 | 10/02/2001 | 04/01/2002 | | | NACT | | | N |

FIGURE 6

Nirvana Pension Fund

Class Action Activity Filings Report (By Lead Motion Due Date)

Requested for Information with the Search Dates from 1998-01-01 to 2003-08-01

| Lead Motion Due | Company Name | Ticker | Cusip/ISIN | Class Begin | Class End | Expanded Class Begin | Expanded Class End | Trade Status | Estimated Mrkt Loss | Profit | Action Recommended |
|---|---|---|---|---|---|---|---|---|---|---|---|
| 09/29/2003 | Stellent, Inc. | STEL | 85856W105 | 10/02/2001 | 04/01/2002 | | | NACT | | | N |
| 08/12/2003 | Guidant Corporation | GDT | 401698105 | 08/17/2001 | 06/12/2003 | 06/23/1999 | 06/12/2003 | ACTPFT | | Profit | N |
| 07/01/2003 | Regeneron Pharmaceuticals, Inc. | REGN | 75886F107 | 03/28/2000 | 03/30/2003 | | | ACT | $758,400.00 | | M |
| 04/23/2001 | Stan Lee Media, Inc. | SLEE | 85285P101 | 08/23/1999 | 12/18/2000 | | | ACT | $133,125.00 | | NCF |
| 03/07/2000 | Policy Management Systems Corp | PMS | 731108106 | 10/22/1998 | 02/10/2000 | | | ACT | $361,870.00 | | NCF |
| 06/15/1998 | Cendant Corporation | CD | 151313103 | 05/31/1995 | 08/28/1998 | | | ACT | $237,300.00 | | NRR |

FIGURE 7

BR&B
*Barrack, Rodos & Bacine*

[Logout]

Please Enter Report Parameters start_date *(in YYYY-MM-DD format)*
1998-01-01 end_date *(in YYYY-MM-DD format)*
2003-08-01

Nirvana Pension Fund

Pending Class Action Monitor Report (By Company Name)

Requested for Information with the Search Dates from 1998-01-01 to 2003-08-01

| Lead Motion Due | Company Name | Ticker | Cusip/ISIN | Class Begin | Class End | Expanded Class Begin | Expanded Class End | Trade Status | Estimated Mrkt Loss | Action Recommended |
|---|---|---|---|---|---|---|---|---|---|---|
| 07/01/2003 | Regeneron Pharmaceuticals, Inc. | REGN | 75886F107 | 03/28/2000 | 03/30/2003 | | | ACT | $758,400.00 | M |

*Barrack, Rodos & Bacine*
*Confidential Attorney Client Work Product - Not To Be Reproduced*

FIGURE 10

Nirvana Pension Fund

Pending Class Action Monitor Report (By Company Name)

Requested for Information with the Search Dates from 1998-01-01 to 2003-08-01

| Lead Motion Due | Company Name | Ticker | Cusip/ISIN | Class Begin | Class End | Expanded Class Begin | Expanded Class End | Trade Status | Estimated Mrkt Loss | Action Recommended |
|---|---|---|---|---|---|---|---|---|---|---|
| 07/01/2003 | Regeneron Pharmaceuticals, Inc. | REGN | 75886F107 | 03/28/2000 | 03/30/2003 | | | ACT | $758,400.00 | M |

FIGURE 11

Nirvana Pension Fund

Pending Class Action Monitor Report (By Lead Motion Due Date)

Requested for Information with the Search Dates from 1998-01-01 to 2003-08-01

| Lead Motion Due | Company Name | Ticker | Cusip/ISIN | Class Begin | Class End | Expanded Class Begin | Expanded Class End | Trade Status | Estimated Mrkt Loss | Action Recommended |
|---|---|---|---|---|---|---|---|---|---|---|
| 07/01/2003 | Regeneron Pharmaceuticals, Inc. | REGN | 75886F107 | 03/28/2000 | 03/30/2003 | | | ACT | $758,400.00 | M |

FIGURE 12

BR&B
*Barrack, Rodos & Bacine*

Results from 1 to 2

[Web Page ▼] [Download]
- Web Page
- Excel
- Printer-Friendly

Nirvana Pension Fund

Pending Claims Administration Report (By Case Name)

[Search] [Logout]

| Company Name | Ticker | Cusip/ISIN | Class Begin | Class End | Claim Deadline Date | Claims Administrator | Date Claim Filed | Claim Status | Trade Status |
|---|---|---|---|---|---|---|---|---|---|
| Policy Management Systems Corp | PMS | 731108106 | 10/22/1998 | 02/10/2000 | 04/12/2002 | Heffler, Radetich & Saitta, L.L.P. | 04/10/2002 | CF | ACT |
| Stan Lee Media, Inc. | SLEE | 85285P101 | 08/23/1999 | 12/18/2000 | 03/20/2003 | Garden City Group, Inc. | 03/19/2003 | CF | ACT |

Results from 1 to 2

FIGURE 14

Nirvana Pension Fund

Pending Claims Administration Report (By Case Name)

Requested for Information with the Search Dates from to

| Company Name | Ticker | Cusip/ISIN | Class Begin | Class End | Claim Deadline Date | Date Claim Filed | Claims Administrator | Claim Status | Trade Status | Estimated Mrkt Loss | Eligible Loss |
|---|---|---|---|---|---|---|---|---|---|---|---|
| Policy Management Systems Corp | PMS | 731108106 | 10/22/1998 | 02/10/2000 | 04/12/2002 | 04/10/2002 | Heffler, Radetich & Saitta, L.L.P. | CF | ACT | $361,870.00 | $16,190.00 |
| Stan Lee Media, Inc. | SLEE | 85285P101 | 08/23/1999 | 12/18/2000 | 03/20/2003 | 03/19/2003 | Garden City Group, Inc. | CF | ACT | $133,125.00 | $21,875.00 |

*Barrack, Rodos & Bacine*
*Confidential Attorney Client Work Product - Not To Be Reproduced*

FIGURE 15

Nirvana Pension Fund

Pending Claims Administration Report (By Case Name)

Requested for Information with the Search Dates from to

| Company Name | Ticker | -Cusip/ISIN | Class Begin | Class End | Claim Deadline Date | Claims Administrator | Date Claim Filed | Claim Status | Trade Status | Estimated Mrkt Loss | Eligible Loss |
|---|---|---|---|---|---|---|---|---|---|---|---|
| Policy Management Systems Corp | PMS | 731108106 | 10/22/1998 | 02/10/2000 | 04/12/2002 | Heffler, Radetich & Saitta, L.L.P. | 04/10/2002 | CF | ACT | $361,870.00 | $16,190.00 |
| Stan Lee Media, Inc. | SLEE | 85285P101 | 08/23/1999 | 12/18/2000 | 03/20/2003 | Garden City Group, Inc. | 03/19/2003 | CF | ACT | $133,125.00 | $21,875.00 |

FIGURE 16

Nirvana Pension Fund

Pending Claims Administration Report (By Claim Deadline Date)

Requested for Information with the Search Dates from to

| Company Name | Ticker | Cusip/ISIN | Class Begin | Class End | Claim Deadline Date | Claims Administrator | Date Claim Filed | Claim Status | Trade Status | Estimated Mrkt Loss | Eligible Loss |
|---|---|---|---|---|---|---|---|---|---|---|---|
| Stan Lee Media, Inc. | SLEE | 85285P101 | 08/23/1999 | 12/18/2000 | 03/20/2003 | Garden City Group, Inc. | 03/19/2003 | CF | ACT | $133,125.00 | $21,875.00 |
| Policy Management Systems Corp | PMS | 731108106 | 10/22/1998 | 02/10/2000 | 04/12/2002 | Heffler, Radetich & Saitta, L.L.P. | 04/10/2002 | CF | ACT | $361,870.00 | $16,190.00 |

FIGURE 17

Nirvana Pension Fund

Claims Recovery Report (By Company Name)

Requested for Information with the Search Dates from 2003-01-01 to 2003-08-01

| Company Name | Ticker | Cusip/ISIN | Claims Administrator | Recovery Forward Date | Recovery Received | Estimated Mrkt Loss | Eligible Loss |
|---|---|---|---|---|---|---|---|
| Cendant Corporation | CD | 151313103 | Heffler, Radetich & Saitta, L.L.P. | 03/31/2003 | $60,747.16 | $237,300.00 | $172,900.00 |

*Barrack, Rodos & Bacine*
*Confidential Attorney Client Work Product - Not To Be Reproduced*

FIGURE 20

Nirvana Pension Fund

Claims Recovery Report (By Company Name)

Requested for Information with the Search Dates from 2003-01-01 to 2003-08-01

| Company Name | Ticker | Cusip/ISIN | Claims Administrator | Recovery Forward Date | Recovery Received | Estimated Mrkt Loss | Eligible Loss |
|---|---|---|---|---|---|---|---|
| Cendant Corporation | CD | 151313103 | Heffler, Radetich & Saitta, L.L.P. | 03/31/2003 | $60,747.16 | $237,300.00 | $172,900.00 |

FIGURE 21

Nirvana Pension Fund

Claims Recovery Report (By Recovery Forward Date)

Requested for Information with the Search Dates from 2003-01-01 to 2003-08-01

| Company Name | Ticker | Cusip/ISIN | Claims Administrator | Recovery Forward Date | Recovery Received | Estimated Mrkt Loss | Eligible Loss |
|---|---|---|---|---|---|---|---|
| Cendant Corporation | CD | 151313103 | Heffler, Radetich & Saitta, L.L.P. | 03/31/2003 | $60,747.16 | $237,300.00 | $172,900.00 |

FIGURE 22

Demonstration Pension Fund

Class Action Activity Filings Report (By Company Name)

Requested for Information with the Search Dates from 1999-01-01 to 2003-06-30

| Lead Motion Due | Company Name | Ticker | Cusip/ISIN | Class Begin | Class End | Expanded Class Begin | Expanded Class End | Trade Status | Estimated Mrkt Loss | Profit | Action Recommended |
|---|---|---|---|---|---|---|---|---|---|---|---|
| 07/01/2003 | Allou Healthcare, Inc. | ALU | 019782101 | 06/22/1998 | 04/09/2003 | | | ACT | | | CHINPROG |
| 01/01/2000 | Boston Chicken, Inc. | BOST | 100578103 | 02/06/1995 | 10/04/1998 | | | ACT | $215,212.44 | | NRR |
| 05/27/2001 | Cell Pathways | CLPA | 15114R101 | 10/27/1999 | 09/22/2000 | | | ACT | $345,123.05 | | NCF |
| 08/12/2001 | ECI Telecom | ECIL | 288258100 | 05/02/2000 | 02/14/2001 | | | ACT | $198,543.34 | | NCF |
| 06/27/2003 | Gainsco, Inc. | GNA | 363127101 | 11/17/1999 | 02/07/2002 | | | ACT | $6,742,742.42 | | FIA |
| 03/04/2002 | Globix Corp. | GBIX | 07814V102 | 11/16/2000 | 12/27/2001 | | | NACT | | | N |
| 03/11/2003 | Hotels.com | ROOM | 441477108 | 10/23/2002 | 01/06/2003 | | | ACT | $4,512,324.45 | | RL |
| 05/10/1999 | Lycos, Inc. | LCOS | 550818108 | 01/04/1999 | 02/09/1999 | | | ACT | $123,456.78 | | NCF |
| 08/30/2002 | Merck & Company | MRK | 589331107 | 07/01/1999 | 06/21/2002 | 07/01/1999 | 07/05/2002 | ACT | $897,647.22 | | MA |
| 08/28/2003 | Morgan Group, Inc., The | MGGP | 617358106 | 11/13/2001 | 08/19/2002 | | | ACT | $432,432.32 | | CALUR |
| 06/10/2003 | Pharmacia Corporation | PHA | 71713U102 | 04/17/2000 | 08/21/2001 | 04/17/2000 | 08/22/2001 | ACT | $789,001.59 | | MA |
| 03/07/2000 | Policy Management Systems Corp | PMS | 731108106 | 10/22/1998 | 02/10/2000 | | | ACT | $132,246.66 | | NRR |
| 12/25/2000 | Prime Retail, Inc. | PRT | 741570105 | 05/28/1999 | 01/18/2000 | | | ACTPFT | | Profit | N |
| 01/01/2000 | Prism Solutions, Inc. | PRZM | 742947104 | 03/15/1996 | 10/14/1996 | | | NACT | | | N |
| 03/30/2002 | QLT, Inc. | QLTI | 746927102 | 08/01/2000 | 12/14/2000 | | | ACT | $2,591.82 | | MP |
| 07/01/2003 | Regeneron Pharmaceuticals, Inc. | REGN | 75886F107 | 03/28/2000 | 03/30/2003 | | | ACT | $459,987.07 | | CALUR |
| 01/01/2000 | Rickel Home Centers, Inc. | RKEL | 765633102 | 11/14/1994 | 01/10/1996 | | | ACT | $183,456.78 | | NRR |
| 08/11/2001 | Robotic Vision Systems, Inc. | ROBV | 771074101 | 01/27/2000 | 05/15/2001 | | | ACT | $256,321.22 | | MA |

FIGURE 23A

| | | | | | | ACTPFT | Profit | N |
|---|---|---|---|---|---|---|---|---|
| 02/24/2003 | Rural Cellular Corp. | RCCC | 7819O4107 | 01/06/2002 | 11/13/2002 | | | |
| 03/29/1999 | Skymall | SKYM | 830859104 | 12/28/1998 | 12/30/1998 | ACT | $444,226.16 | NCF |
| 04/23/2001 | Stan Lee Media, Inc. | SLEE | 85285P101 | 08/23/1999 | 12/18/2000 | ACT | $456,712.04 | NCF |
| 06/13/2003 | SuperGen Inc. | SUPG | 868059106 | 04/18/2000 | 03/13/2003 | ACT | $742,440.22 | MA |
| 03/16/2003 | Westar Energy, Inc. | WR | 95709T100 | 03/30/2001 | 12/26/2002 | ACT | $545,678.90 | MA |
| 02/22/2001 | Westell Technologies, Inc. | WSTL | 957541105 | 06/27/2000 | 10/18/2000 | ACT | $645,678.99 | MA |
| 01/01/2000 | Ziff-Davis, Inc. | ZDZ | 989511100 | 04/29/1998 | 10/08/1998 | ACT | $99,456.21 | RF |

FIGURE 23B

Demonstration Pension Fund

Class Action Activity Filings Report (By Company Name)

Requested for Information with the Search Dates from 2003-01-01 to 2003-06-30

| Lead Motion Due | Company Name | Ticker | Cusip/ISIN | Class Begin | Class End | Expanded Class Begin | Expanded Class End | Trade Status | Estimated Mrkt Loss | Profit | Action Recommended |
|---|---|---|---|---|---|---|---|---|---|---|---|
| 07/01/2003 | Allou Healthcare, Inc. | ALU | 019782101 | 06/22/1998 | 04/09/2003 | | | ACT | | | CHINPROG |
| 06/27/2003 | Gainsco, Inc. | GNA | 363127101 | 11/17/1999 | 02/07/2002 | | | ACT | $6,742,742.42 | | FIA |
| 03/11/2003 | Hotels.com | ROOM | 44147T108 | 10/23/2002 | 01/06/2003 | | | ACT | $4,512,324.45 | | RL |
| 06/28/2003 | Morgan Group, Inc., The | MGGP | 617358106 | 11/13/2001 | 08/19/2002 | | | ACT | $432,432.32 | | CALUR |
| 06/10/2003 | Pharmacia Corporation | PHA | 71713U102 | 04/17/2000 | 08/21/2001 | 04/17/2000 | 08/22/2001 | ACT | $789,001.59 | | MA |
| 07/01/2003 | Regeneron Pharmaceuticals, Inc. | REGN | 75886F107 | 03/28/2000 | 03/30/2003 | | | ACT | $459,987.07 | | CALUR |
| 06/13/2003 | SuperGen Inc. | SUPG | 868059106 | 04/18/2000 | 03/13/2003 | | | ACT | $742,440.22 | | MA |
| 03/16/2003 | Westar Energy, Inc. | WR | 95709T100 | 03/30/2001 | 12/26/2002 | | | ACT | $545,678.90 | | MA |

FIGURE 24

Demonstration Pension Fund

Class Action Activity Filings Report (By Lead Motion Due Date)

Requested for Information with the Search Dates from 2003-01-01 to 2003-06-30

| Lead Motion Due | Company Name | Ticker | Cusip/ISIN | Class Begin | Class End | Expanded Class Begin | Expanded Class End | Trade Status | Estimated Mrkt Loss | Profit | Action Recommended |
|---|---|---|---|---|---|---|---|---|---|---|---|
| 07/01/2003 | Allou Healthcare, Inc. | ALU | 019782101 | 06/22/1998 | 04/09/2003 | | | ACT | | | CHINPROG |
| 07/01/2003 | Regeneron Pharmaceuticals, Inc. | REGN | 75886F107 | 03/28/2000 | 03/30/2003 | | | ACT | $459,987.07 | | CALUR |
| 06/28/2003 | Morgan Group, Inc., The | MGGP | 6173581O6 | 11/13/2001 | 08/19/2002 | | | ACT | $432,432.32 | | CALUR |
| 06/27/2003 | Gainsco, Inc. | GNA | 363127101 | 11/17/1999 | 02/07/2002 | | | ACT | $6,742,742.42 | | FIA |
| 06/13/2003 | SuperGen Inc. | SUPG | 868059106 | 04/18/2000 | 03/13/2003 | | | ACT | $742,440.22 | | MA |
| 06/10/2003 | Pharmacia Corporation | PHA | 71713U102 | 04/17/2000 | 08/21/2001 | 04/17/2000 | 08/22/2001 | ACT | $789,001.59 | | MA |
| 03/16/2003 | Westar Energy, Inc. | WR | 957O9T100 | 03/30/2001 | 12/26/2002 | | | ACT | $545,678.90 | | MA |
| 03/11/2003 | Hotels.com | ROOM | 441477T108 | 10/23/2002 | 01/06/2003 | | | ACT | $4,512,324.45 | | RL |

FIGURE 25

Demonstration Pension Fund

Pending Class Action Monitor Report (By Company Name)

Requested for Information with the Search Dates from 2003-01-01 to 2003-06-30

| Lead Motion Due | Company Name | Ticker | Cusip/ISIN | Class Begin | Class End | Expanded Class Begin | Expanded Class End | Trade Status | Estimated Mrkt Loss | Action Recommended |
|---|---|---|---|---|---|---|---|---|---|---|
| 06/27/2003 | Gainsco, Inc. | GNA | 363127101 | 11/17/1999 | 02/07/2002 | | | ACT | $6,742,742.42 | FIA |
| 03/11/2003 | Hotels.com | ROOM | 44147T108 | 10/23/2002 | 01/06/2003 | | | ACT | $4,512,324.45 | RL |
| 06/28/2003 | Morgan Group, Inc., The | MGGP | 617358106 | 11/13/2001 | 08/19/2002 | | | ACT | $432,432.32 | CALUR |
| 06/10/2003 | Pharmacia Corporation | PHA | 71713U102 | 04/17/2000 | 08/21/2001 | 04/17/2000 | 08/22/2001 | ACT | $789,001.59 | MA |
| 07/01/2003 | Regeneron Pharmaceuticals, Inc. | REGN | 75886F107 | 03/28/2000 | 03/30/2003 | | | ACT | $459,987.07 | CALUR |
| 06/13/2003 | SuperGen Inc. | SUPG | 868059106 | 04/18/2000 | 03/13/2003 | | | ACT | $742,440.22 | MA |
| 03/16/2003 | Westar Energy, Inc. | WR | 95709T100 | 03/30/2001 | 12/26/2002 | | | ACT | $545,678.90 | MA |

FIGURE 26

Demonstration Pension Fund

Pending Class Action Monitor Report (By Lead Motion Due Date)

Requested for Information with the Search Dates from 2003-01-01 to 2003-06-30

| Lead Motion Due | Company Name | Ticker | Cusip/ISIN | Class Begin | Class End | Expanded Class Begin | Expanded Class End | Trade Status | Estimated Mrkt Loss | Action Recommended |
|---|---|---|---|---|---|---|---|---|---|---|
| 07/01/2003 | Regeneron Pharmaceuticals, Inc. | REGN | 75886F107 | 03/28/2000 | 03/30/2003 | | | ACT | $459,987.07 | CALUR |
| 06/28/2003 | Morgan Group, Inc., The | MGGP | 617358106 | 11/13/2001 | 08/19/2002 | | | ACT | $432,432.32 | CALUR |
| 06/27/2003 | Gainsco, Inc. | GNA | 363127101 | 11/17/1999 | 02/07/2002 | | | ACT | $6,742,742.42 | FIA |
| 06/13/2003 | SuperGen Inc. | SUPG | 868059106 | 04/18/2000 | 03/13/2003 | | | ACT | $742,440.22 | MA |
| 06/10/2003 | Pharmacia Corporation | PHA | 71713U102 | 04/17/2000 | 08/21/2001 | 04/17/2000 | 08/22/2001 | ACT | $789,001.59 | MA |
| 03/16/2003 | Westar Energy, Inc. | WR | 95709T100 | 03/30/2001 | 12/26/2002 | | | ACT | $545,678.90 | MA |
| 03/11/2003 | Hotels.com | ROOM | 44147T108 | 10/23/2002 | 01/06/2003 | | | ACT | $4,512,324.45 | RL |

FIGURE 27

Demonstration Pension Fund

Pending Claims Administration Report (By Case Name)

| Company Name | Ticker | Cusip/ISIN | Class Begin | Class End | Claim Deadline Date | Claims Administrator | Date Claim Filed | Claim Status | Trade Status | Estimated Mrkt Loss | Eligible Loss |
|---|---|---|---|---|---|---|---|---|---|---|---|
| Applesouth | APSO | 037857109 | 05/26/1995 | 09/24/1996 | 03/05/2003 | Gilardi & Co. LLC | 03/01/2003 | TBV | ACT | $109,654.87 | $100,000.00 |
| Cell Pathways | CLPA | 15114R101 | 10/27/1999 | 09/22/2000 | 10/04/2002 | Heffler, Radetich & Saitta, L.L.P. | 08/02/2002 | CF | ACT | $345,123.05 | $289,432.21 |
| E. I. DuPont de Nemours & Co. | DD | 263534109 | 06/19/1993 | 01/27/1995 | 09/15/2003 | FRG Information System Corp. | | TBF | ACT | $2,190,456.89 | unavailable |
| ECI Telecom | ECIL | 268258100 | 05/02/2000 | 02/14/2001 | 01/14/2003 | Garden City Group, Inc. | 12/10/2002 | CF | ACT | $198,543.34 | $123,456.98 |
| Lycos, Inc. | LCOS | 550818108 | 01/04/1999 | 02/09/1999 | 08/15/2003 | Gilardi & Co. LLC | 04/15/2003 | CF | ACT | $123,456.78 | $89,456.78 |
| Robotic Vision Systems, Inc. | ROBV | 771074101 | 01/27/2000 | 05/15/2001 | 08/11/2003 | Gilardi & Co. LLC | | TBF | ACT | $256,321.22 | unavailable |
| Skymall | SKYM | 830859104 | 12/28/1998 | 12/30/1998 | 01/15/2003 | Berdon LLP | 12/10/2002 | CF | ACT | $444,226.16 | $301,654.32 |
| Stan Lee Media, Inc. | SLEE | 85285P101 | 08/23/1999 | 12/18/2000 | 03/20/2003 | Garden City Group, Inc. | 03/20/2003 | CF | ACT | $456,712.04 | $256,712.04 |
| Westell Technologies, Inc. | WSTL | 957541105 | 06/27/2000 | 10/18/2000 | 08/31/2003 | Garden City Group, Inc. | | TBF | ACT | $645,678.99 | unavailable |

FIGURE 28

Demonstration Pension Fund

Pending Claims Administration Report (By Claim Deadline Date)

| Company Name | Ticker | Cusip/ISIN | Class Begin | Class End | Claim Deadline Date | Claims Administrator | Date Claim Filed | Claim Status | Trade Status | Estimated Mrkt Loss | Eligible Loss |
|---|---|---|---|---|---|---|---|---|---|---|---|
| E. I. DuPont de Nemours & Co. | DD | 263534109 | 06/19/1993 | 01/27/1995 | 09/15/2003 | FRG Information System Corp. | | TBF | ACT | $2,190,456.89 | unavailable |
| Westell Technologies, Inc. | WSTL | 957541105 | 06/27/2000 | 10/18/2000 | 08/31/2003 | Garden City Group, Inc. | | TBF | ACT | $645,678.99 | unavailable |
| Lycos, Inc. | LCOS | 550818108 | 01/04/1999 | 02/09/1999 | 08/15/2003 | Gilardi & Co. LLC | 04/15/2003 | CF | ACT | $123,456.78 | $89,456.78 |
| Robotic Vision Systems, Inc. | ROBV | 771074101 | 01/27/2000 | 05/15/2001 | 08/11/2003 | Gilardi & Co. LLC | | TBF | ACT | $256,321.22 | unavailable |
| Stan Lee Media, Inc. | SLEE | 85285P101 | 08/23/1999 | 12/18/2000 | 03/20/2003 | Garden City Group, Inc. | 03/20/2003 | CF | ACT | $456,712.04 | $256,712.04 |
| Applesouth | APSO | 037857109 | 05/26/1995 | 09/24/1996 | 03/05/2003 | Gilardi & Co. LLC | 03/01/2003 | TBV | ACT | $109,654.87 | $100,000.00 |
| Skymall | SKYM | 830859104 | 12/28/1998 | 12/30/1998 | 01/15/2003 | Berdon LLP | 12/10/2002 | CF | ACT | $444,226.16 | $301,654.32 |
| ECI Telecom | ECIL | 268258100 | 05/02/2000 | 02/14/2001 | 01/14/2003 | Garden City Group, Inc. | 12/10/2002 | CF | ACT | $198,543.34 | $123,456.98 |
| Cell Pathways | CLPA | 15114R101 | 10/27/1999 | 09/22/2000 | 10/04/2002 | Heffler, Radetich & Saitta, L.L.P. | 08/02/2002 | CF | ACT | $345,123.05 | $289,432.21 |

FIGURE 29

Demonstration Pension Fund

Claims Recovery Report (By Company Name)

Requested for Information with the Search Dates from 2000-01-01 to 2003-06-30

| Company Name | Ticker | Cusip/ISIN | Claims Administrator | Recovery Forward Date | Recovery Received | Estimated Mrkt Loss | Eligible Loss |
|---|---|---|---|---|---|---|---|
| Boston Chicken, Inc. | BOST | 100578103 | Heffler, Radetich & Saitta, L.L.P. | 04/30/2003 | $157,987.03 | $215,212.44 | $167,987.03 |
| Cendant Corporation | CD | 151313103 | Heffler, Radetich & Saitta, L.L.P. | 04/17/2003 | $1,021,456.12 | $2,456,789.12 | $1,987,654.21 |
| Nationsbank Corporation | NB | 638585109 | Heffler, Radetich & Saitta, L.L.P. | 01/22/2003 | $201,459.23 | $218,145.43 | $208,145.43 |
| Policy Management Systems Corp | PMS | 731108106 | Heffler, Radetich & Saitta, L.L.P. | 01/18/2003 | $104,123.42 | $132,246.86 | $100,000.00 |
| Rickel Home Centers, Inc. | RKEL | 765633102 | FRG Information System Corp. | 03/04/2003 | $98,214.34 | $183,456.78 | $118,456.78 |
| Ziff-Davis, Inc. | ZDZ | 989511100 | Berdon LLP | 01/21/2003 | $80,423.44 | $99,456.21 | $94,423.44 |
| | | | | Total: | $1,663,663.58 | | |

FIGURE 30

Demonstration Pension Fund

Claims Recovery Report (By Recovery Forward Date)

Requested for Information with the Search Dates from 2000-01-01 to 2003-06-30

| Company Name | Ticker | Cusip/ISIN | Claims Administrator | Recovery Forward Date | Recovery Received | Estimated Mrkt Loss | Eligible Loss |
|---|---|---|---|---|---|---|---|
| Boston Chicken, Inc. | BOST | 100578103 | Heffler, Radetich & Saitta, L.L.P. | 04/30/2003 | $157,987.03 | $215,212.44 | $167,987.03 |
| Cendant Corporation | CD | 151313103 | Heffler, Radetich & Saitta, L.L.P. | 04/17/2003 | $1,021,456.12 | $2,456,789.12 | $1,987,654.21 |
| Rickel Home Centers, Inc. | RKEL | 765633102 | FRG Information System Corp. | 03/04/2003 | $98,214.34 | $183,456.78 | $118,456.78 |
| Nationsbank Corporation | NB | 638585109 | Heffler, Radetich & Saitta, L.L.P. | 01/22/2003 | $201,459.23 | $218,145.43 | $208,145.43 |
| Ziff-Davis, Inc. | ZDZ | 989511100 | Berdon LLP | 01/21/2003 | $80,423.44 | $99,456.21 | $94,423.44 |
| Policy Management Systems Corp | PMS | 731108106 | Heffler, Radetich & Saitta, L.L.P. | 01/18/2003 | $104,123.42 | $132,246.86 | $100,000.00 |
| | | | | Total: | $1,663,663.58 | | |

FIGURE 31

NIRVANA PENSION FUND – (custodial records)

| COMPANY | CUSIP/Ticker | Date of Purchase | # Shares Purchased | Purchase Price | Date of Sale | # Shares Sold | Sale Price |
|---|---|---|---|---|---|---|---|
| Ford Motor Company | 709776108 F | 1/4/1993 | 30,000 | $8.02 | 12/31/1998 | 30,000 | $32.25 |
| Westar Energy Inc. | 95709T100 WR | 1/3/1994 | 10,000 | $34.62 | 12/31/1999 | 10,000 | $16.93 |
| DuPont Co. | 263534109 DD | 1/3/1995 | 50,000 | $56.00 | 12/29/2000 | 50,000 | $48.31 |
| CUC Corp. (Cendant) | 126545102 CU | 1/2/1996 | 70,000 | $23.00 | 12/31/2001 | 70,000 | $19.61 |
| Carnival Inc. | 143658102 CCL | 1/2/1997 | 50,000 | $15.87 | 12/31/2002 | 50,000 | $24.95 |
| Amazon.com | 76126W108 AMZN | 1/2/1998 | 50,000 | $4.95 | | | |
| Policy Mgmt. Sys. Corp. | 731108106 PMS | 1/4/1999 | 10,000 | $51.00 | | | |
| Stan Lee Media, Inc. | 85285P101 SLEE | 1/3/2000 | 25,000 | $5.45 | | | |
| Home Depot | 437076102 HD | 1/2/2001 | 125,000 | $45.56 | | | |
| Guidant Corporation | 401698105 GDT | 1/2/2002 | 50,000 | $48.82 | 02/14/2002 | 50,000 | $49.80 |
| Regeneron Pharmaceuticals, Inc. | 75886F107 REGN | 1/2/2003 | 60,000 | $19.09 | | | |

| Purchase Date | No. of shares | Price per share | Total | Sale Date | No. of shares | Price per share | Total | (Profit) Loss |
|---|---|---|---|---|---|---|---|---|
| 3/2/2000 | 2000 | 100.00 | 200,000 | 5/29/2000 | 2000 | 50.00 | 100,000 | 100,000 |

FIGURE 40

| Purchase Date | No. of Shares | Price per Share | Total | Sale Date | No. of Shares | Price per Share | Total | (Profit) Loss |
|---|---|---|---|---|---|---|---|---|
| Beg Bal | 100,000 | --- | --- | 5/29/00 | 2000 | 50.00 | 100,000 | --- |
| 3/2/2000 | 2000 | 100.00 | 200,000 | Retained | 2000 | 20.00 | 40,000 | 160,000 |

FIGURE 41

REPORT GENERATOR FOR ALLOWING A FINANCIAL ENTITY TO MONITOR SECURITIES CLASS ACTION LAWSUITS AND POTENTIAL MONETARY CLAIMS RESULTING THEREFROM

COMPACT DISC APPENDIX

This patent application includes an Appendix on one compact disc having a file named appendix.txt, created on Aug. 8, 2003, and having a size of 142,054 bytes. The compact disc is incorporated by reference into the present patent application.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

Many financial entities, such as investment companies and publicly and privately held investment funds have a fiduciary responsibility to manage their assets for the exclusive benefit of their shareholders or beneficiaries. One aspect of this duty is to take all reasonable steps to collect any money that the financial entity may be entitled to for securities that were purchased or acquired by the financial entity and that suffered a "market loss" which was determined to be compensable in a securities class action lawsuit (also, referred to as a "securities fraud class action").

When a securities class action lawsuit is filed or concluded, no party in the lawsuit is required to identify all of the financial entities that suffered a market loss. When a securities class action lawsuit is concluded, a "settlement notice" is issued. Parties who believe that they are entitled to an award under the terms of the settlement notice (i.e., class members) must timely file a "proof of claim" with a claims administrator to receive monies from the settlement. The burden falls on the financial entities that suffered the loss to identify their eligibility to participate in the lawsuit and to receive a recovery award.

Hundreds of securities class action lawsuits are filed every year. Since securities class action lawsuits are typically pending for many years, there may be thousands of such lawsuits pending at any time. A large financial entity such as a public pension fund may hold thousands of securities at any one time, and may trade thousands of securities each year. To be eligible for a monetary award from a securities class action lawsuit, the security typically must have been purchased during the "class period" specified in the lawsuit. Sometimes, eligibility exists if the security was acquired (by other than a purchase) or sold during the class period.

It is a complex and monumental task for financial entities to monitor all significant securities class action lawsuits to (a) determine when a potential market loss exists for security that was purchased or acquired by the financial entity during the class period, (b) estimate the amount of loss, and (c) determine whether it is prudent to take measures to try to recover part of the loss. Accordingly, many financial entities take no measures to identify and seek recoveries despite the fiduciary responsibility to do so.

In instances where a financial entity suffered a significant estimated market loss, it may be prudent for the financial entity to play an active role in the lawsuit, such as by being a lead plaintiff or by filing an individual action. However, this decision will be forfeited if the financial entity fails to identify their estimated market loss early on in the lawsuit. If the estimated market loss only justifies a passive role for the financial entity, it is still necessary for the financial entity to monitor the lawsuit if a recovery is desired.

An automated management tool that allows a financial entity to receive reports which evaluate their position with respect to any given securities class action lawsuit and which track any identified potential market loss through the conclusion of a lawsuit would allow financial entities to more easily fulfill their fiduciary responsibility with respect to securities class action lawsuits without unduly burdening the financial entities with administrative tasks. The present invention fulfills such a need.

BRIEF SUMMARY OF THE INVENTION

The present invention provides a system and method that automatically creates reports to allow a financial entity to review and track potential monetary claims resulting from securities class action lawsuits for securities purchased or acquired by the financial entity. To create the reports, a first database of transaction activity for the financial entity is accessed. The transaction activity includes an identification of each security purchased or acquired, and the date of each purchase or acquisition. A second database of securities class action lawsuits is accessed. The second database includes for each lawsuit an identification of all securities associated with the class action lawsuit, and the class period of the lawsuit. The transaction activity of the financial entity is automatically compared with the securities class action lawsuits in the second database, and any securities purchased or acquired by the financial entity during the class period that are associated with an entered securities class action lawsuit are identified. The identified securities may provide a potential monetary claim for the financial entity. A report is then automatically created of at least the lawsuits that may provide a potential monetary claim for the financial entity based on the transaction activity of the financial entity. The report also includes estimated market loss and eligible loss information, as well as any actions recommended to be taken by the financial entity regarding the lawsuits.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings:

FIGS. 1–22 are screen shots and report printouts associated with one embodiment of the present invention, implemented as a web-enabled service;

FIGS. 23–31 show additional reports that are available when using the system of the present invention;

FIG. 33 shows a representation of transaction activity as obtained from the custodial records of a fictional financial entity.

Figure 36:
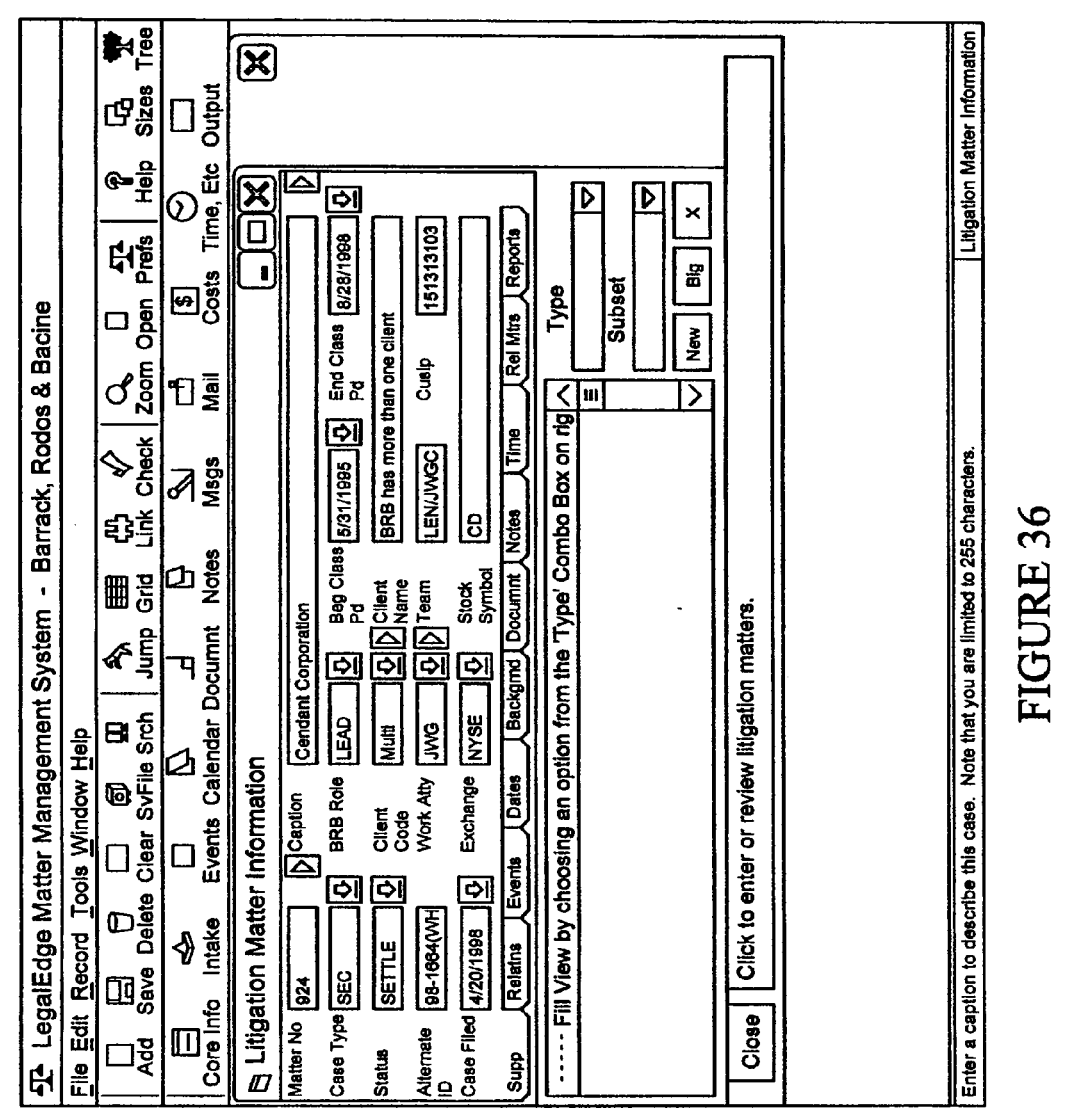
Figure 39:
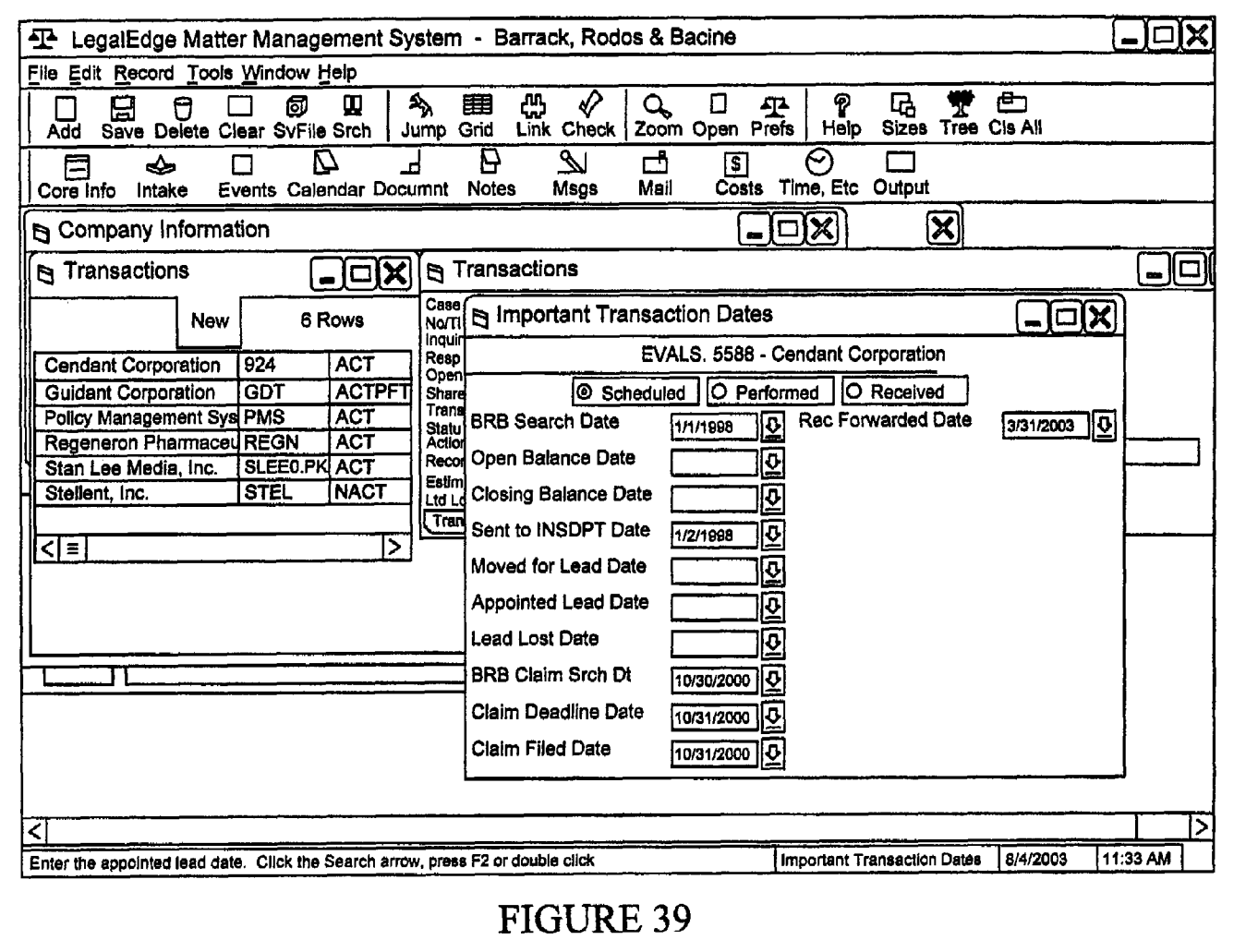

FIGS. 35–39 show sample input screens for entering lawsuits into a database and for tracking client data;

FIG. 40 shows the data associated with an estimated market loss calculation; and FIG. 41 shows the data associated with an eligible loss calculation.

DETAILED DESCRIPTION OF THE INVENTION

Figure 1:
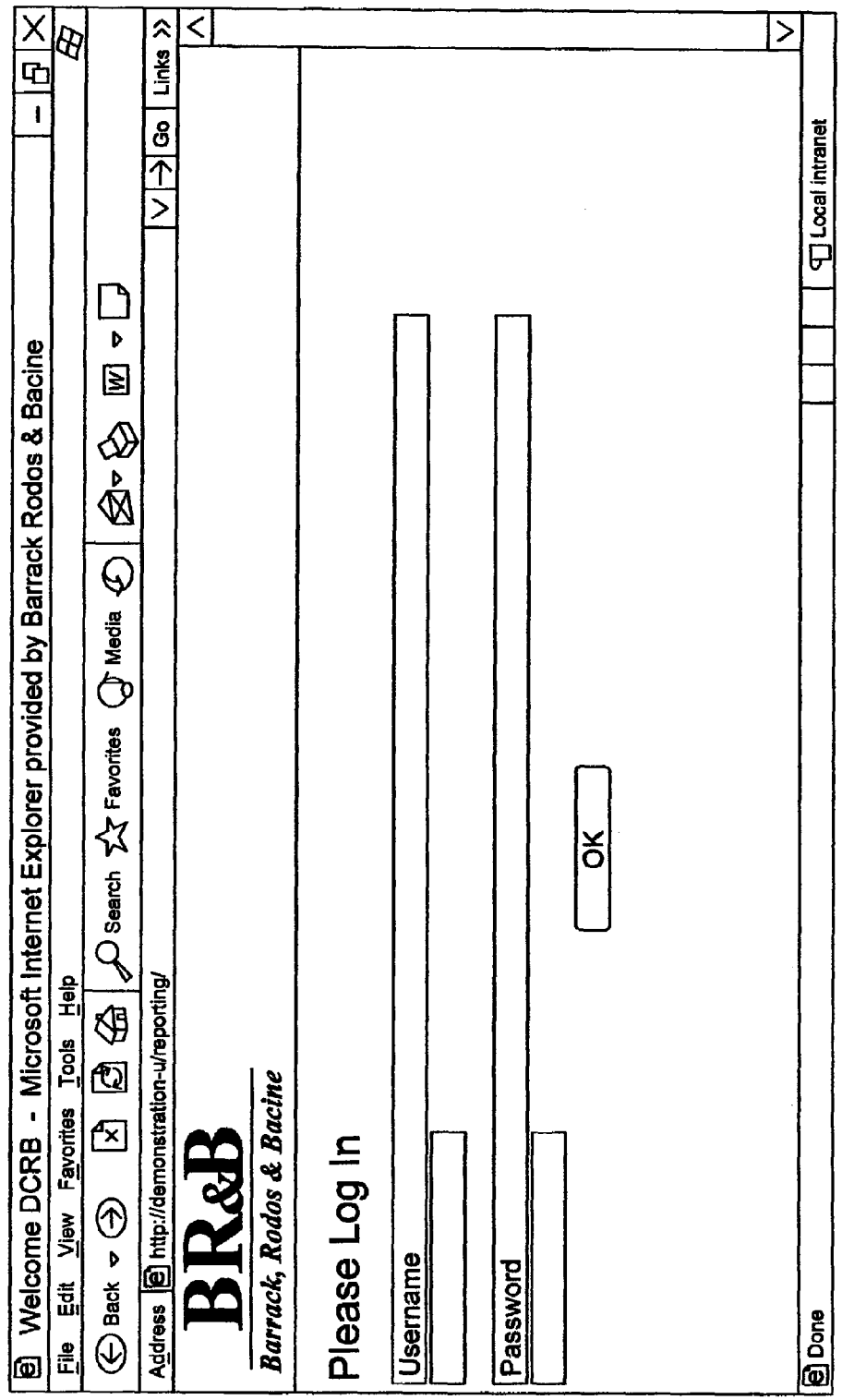

Certain terminology is used herein for convenience only and is not to be taken as a limitation on the present invention. In the drawings, the same reference letters are employed for designating the same elements throughout the several figures.

1. Overview of Present Invention

One preferred embodiment of the present invention is described in the context of a service provided by Barrack, Rodos & Bacine, Philadelphia, Pa., a partnership including professional corporations. The service allows a financial entity to access various types of static reports via the Internet by logging onto a website. The service updates the reports on a periodic basis to reflect the most current information pertaining to the financial entity and the status of securities class action lawsuits tracked by the service. Preferably, the service is provided to a plurality of financial entities or clients. ("Financial entities" and clients are referred to interchangeably herein.) Each financial entity has password protected access to receive only reports that pertain to their portfolio.

The financial entity may be any form of entity that has an identifiable investment portfolio. Therefore, the financial entity may be an investment company, a pension fund, a trust, an individual investor, or the like.

To generate the reports, the service performs the following functions, each of which is described in detail below:

1. Maintain a first database of transaction activity (e.g., trading records) for a financial entity. The transaction activity includes at least an identification of each security purchased or acquired, and the date of each purchase or acquisition.

2. Maintain a second database of securities class action lawsuits. The second database includes for each lawsuit at least an identification of all securities associated with the class action lawsuit, and the class period of the lawsuit.

3. Compare the transaction activity of the financial entity with the securities class action lawsuits in the second database.

4. Identify any securities purchased or acquired by the financial entity during the class period that are associated with an entered securities class action lawsuit. The identified securities may provide a potential monetary claim for the financial entity.

5. Calculate an estimated market loss for each of the identified securities, and upon settlement of the respective lawsuit, calculate the eligible loss.

In one preferred embodiment of the present invention, four different types of reports are generated, as follows:

1. Class Action Activity Filing Report (by company name or lead motion due date). This report shows all lawsuits in the second database, including any lawsuits that do not provide a potential monetary claim for the financial entity based on the transaction activity of the financial entity.

2. Pending Class Action Monitor Report (by company name or lead motion due date). This report shows only the lawsuits in the second database that provide a potential monetary claim for the financial entity based on the transaction activity of the financial entity.

3. Pending Claims Administration Report (by case name or claim deadline date). This report shows both the estimated loss and the eligible loss for the financial entity.

4. Claims Recovery Report (by company name or recovery forward date). This report estimated loss, eligible loss, and the recovery received.

2. Detailed Disclosure

One important feature of the present invention is the ability to present the reports described above to the financial entity. To illustrate the report capabilities and report accessing process, a sample instruction manual is provided below. In the sample, reports for an imaginary financial entity entitled "Nirvana Pension Fund" are shown. The reports are shown as screen shots and are also shown as they appear if printed out. The securities class action lawsuits shown in the reports are actual lawsuits. In the illustrated example, the client (Nirvana) accesses the reports via the Internet by using a browser to log onto a web site.

I. Instruction Manual

How to Access Nirvana's Reports Through Barrack, Rodos & Bacine's Web Page

1. Go to www.barrack.com

2. Click on "Click here to enter main site," which is below opening graphic

3. Click on the "Institutional log-on" button in the upper-right corner

4. A Network Password box, as pictured in FIG. 1, will prompt you to enter your User Name and Password information, which has been provided to you by Barrack, Rodos & Bacine ("BR&B")

Figure 2:
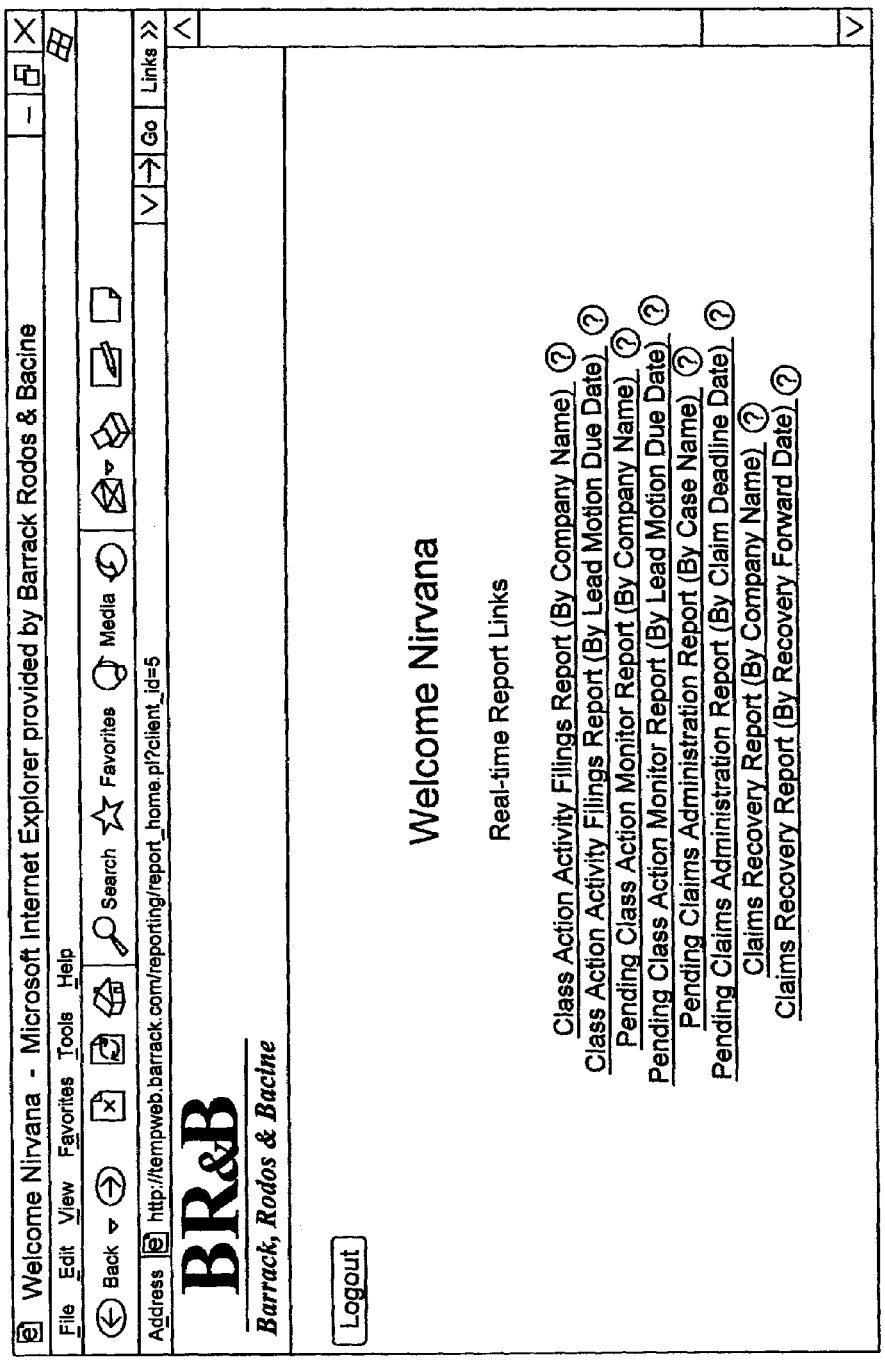

5. You are now on the Barrack, Rodos & Bacine/Nirvana's Report Links page (pictured in FIG. 2)

Client Reports Available via Barrack, Rodos & Bacine Web Site

There are four types of reports, each of which is sorted in two ways. To run any of the eight reports listed below, click on the report name. Descriptions of these reports and how to use are described below in sections A–D.

What is the (?): When you click on the (?) next to the name of a report, a brief description of that report is displayed.

A. Class Action Activity Filings Report (sorted by Lead Motion Due Date) and Class Action Activity Filings Report (Sorted by Case Name)

What Are These Reports: These reports provide an overview of securities class actions filed since (DATE). The report can be used to determine whether Nirvana had a position in any given case. If there were no transactions during a given class period, there is "no activity," therefore Nirvana has no claim and no action is recommended. If, however, there are transactions during the relevant class period, calculations are made in order to determine whether Nirvana suffered a loss as a result. If Nirvana suffered a loss in a given case, that loss appears in the "Estimated Market Loss" column. Analysis is made as to the appropriate action to take, which is listed in the "Action Recommended" column. When a loss has been suffered, the case also appears on the Class Action Monitor Report.

| Abbreviation | Description |
|---|---|
| *i. Trade Status Terms* | |
| ACT | Activity during Class Period |
| ACTFGN | Activity/Foreign Shares Only |
| ACTFGNBNDS | Activity/Bonds & Foreign Shares Only |
| ACTPFT | Activity/Profit during Class Period |
| BONDS | Bonds Only |
| DINC | Data Incomplete |
| D/N/A | Data Not Available |
| NACT | No Activity during Class Period |
| SRCHPEND | Search Pending |
| CALUR | Calculation Under Review |
| CHINPROG | Chart in Progress |
| *ii. Action Recommended Terms* | |
| FDA | File Derivative Action |
| FIA | File Individual Action |
| INV | Further Investigation Required |
| LOCP | Loss Outside of Class Period/Possible Individual Action |
| M | Monitor |
| MPS | Monitor/Pending Settlement |
| N | None |
| NCF | None/Claim Filed |
| NRR | None/Recovery Received |
| PC | Possible Claim |
| PLOCP | Partial Loss Outside of Class Period/Possible Ind. Action |
| RL | Recommended Lead |
| RLM | Recommended Lead/Moved |
| RLA | Recommended Lead/Appointed |
| UR | Under Review |

This is How it Works: When BR&B receives notice that a securities class action suit has been filed, BR&B searches your fund's transaction information for purchases of that particular stock during the reported class period. These reports will list the class actions that have been filed during a specific time period. For Nirvana, cases filed as early as (DATE) may be selected to be listed on this report. These reports will list the cases that have been filed during a specific time period listing the transaction results from the search. These reports include cases that BR&B has searched on behalf of your fund, noting whether or not it had activity during the class period or if the data is not available.

The following information is listed on this report: Lead Motion Due Date, Company/Case Name; Ticker; Cusip/ISIN; Class Begin Date; Class End Date; Expanded Class Begin; Expanded Class End; Trade Status; Estimated Market Loss; Profit; Action Recommended (by BR&B).

How to Run The "Activity Filings" Reports: When you click on the report name, a screen, pictured in FIG. 3 is displayed.

"Start Date"—"End Date" boxes require dates. The dates that are being requested are the Case Filed dates. For example, you may want to see the class action cases that were filed during the time period of Jan. 1, 1998 through Aug. 1, 2003 in which BR&B searched Nirvana's transactional information. The dates should be entered as displayed above. Click OK.

The report will appear on your screen as pictured in FIG. 4.

You may: (a) view this entire report on the web; (b) print the report; (c) download the report to an Excel spreadsheet; or (d) search for a particular item. Search Feature: You may enter the name of any company, ticker symbol, cusip number in the search box field, and a window will be displayed with the search results. To Print this Report: Select "Printer-Friendly" above and "Download". The Report will be displayed as pictured in FIG. 5. Choose File and Print (remember that all reports should be printed in "landscape".) (Note: full printouts of the "Activity Filings" reports are shown in FIG. 6 and FIG. 7.)

To Download to Excel: Choose the Excel option and "Download".

B. Pending Class Action Monitor Report (Sorted by Lead Motion Due Date) and Pending Class Action Monitor Report (Sorted by Case Name)

What Are These Reports: These reports serve as a monitoring tool to assist the Nirvana's board and staff in monitoring cases in which Nirvana has a loss position. When losses are incurred which exceed Nirvana's thresholds for consideration of lead plaintiff status, BR&B will analyze the case and make a recommendation as to the appropriate action, providing a copy of such analysis to Nirvana's General Counsel. As settlement notices occur in the future, such notices will be monitored and appropriate action will be recommended. Typically, the case will be moved to the Claims Administration Report. If, however, we determine the settlement is inappropriate in some way, other action (such as opting out or objecting) may be recommended.

No New Terms Appear on This Report.

This is How it Works: When BR&B receives notice that a securities class action suit has been filed, BR&B searches your fund's transactional information for its purchases in that particular stock during the reported class period. This report will list only those class actions for which BR&B has performed a search for Nirvana and for which Nirvana has suffered a loss.

Listed on this report is the following information for each case: Lead Motion Due Date, Company/Case Name; Ticker; Cusip/ISIN; Class Begin Date; Class End Date; Expanded Class Begin; Expanded Class End; Trade Status; Estimated Market Loss; Action Recommended (by BR&B).

How to Run The "Monitor" Reports: When you click on the report name, a screen, pictured in FIG. 8, is displayed:

"Start Date"—"End Date" boxes require dates. The dates that are being requested are the Case Filed dates. For example, you may want to see the class action cases that were filed during the time period of Jan. 1, 1998 through Aug. 1, 2003 in which BR&B searched Nirvana's transactional information and Nirvana has suffered a loss. The dates should be entered as displayed above. Click OK.

Figure 9:
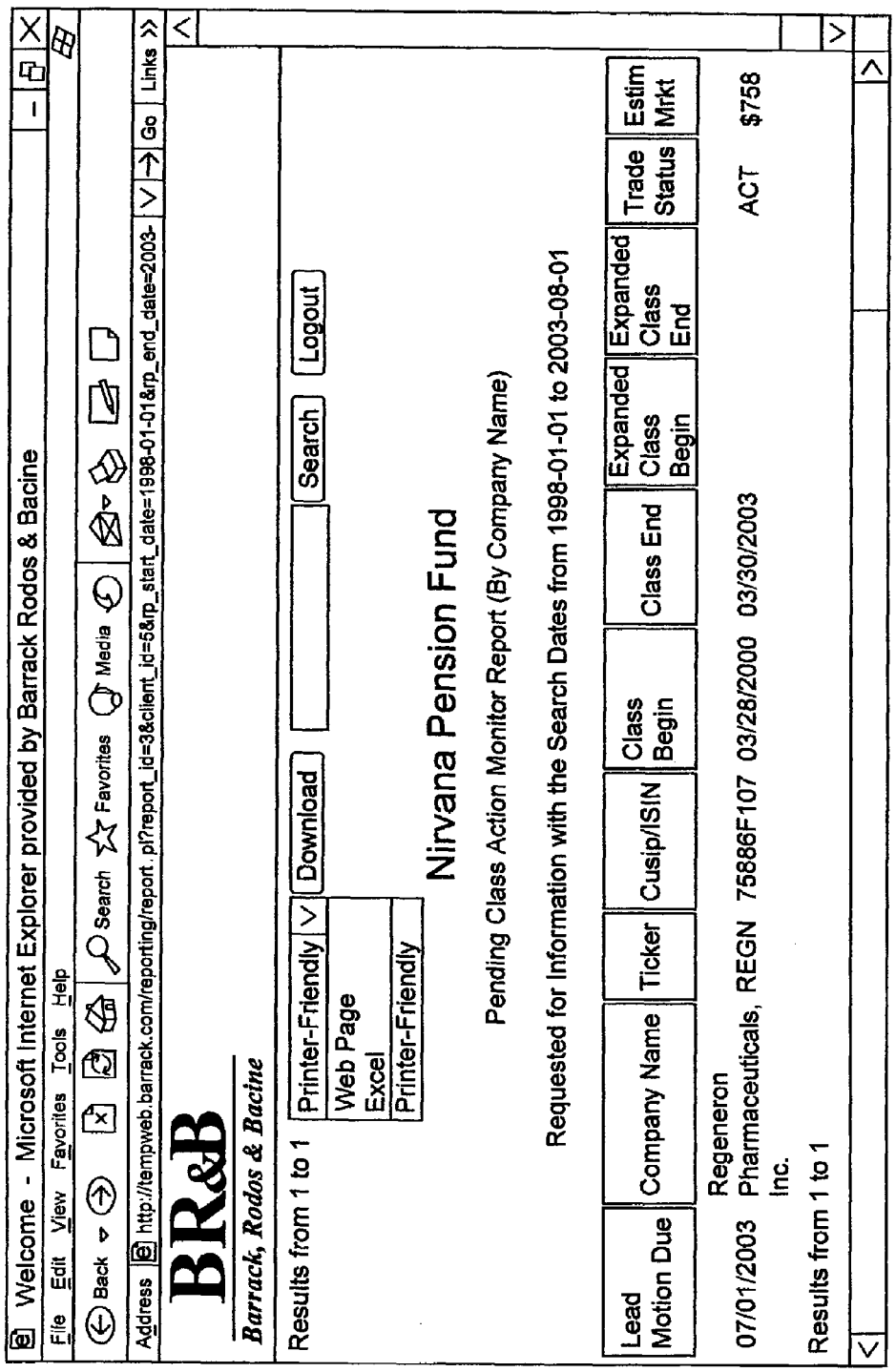

The report will appear on your screen as pictured in FIG. 9.

You may: (a) view this entire report on the web; (b) print the report; (c) download the report to an Excel spreadsheet; or (d) search for a particular item.

Search Feature: You may enter the name of any company, ticker symbol, cusip number in the search box field, and a window will be displayed with the search results.

To Print this Report: Select "Printer-Friendly" above and "Download". The Report will be displayed as pictured in FIG. 10. Choose File and Print (remember that all reports should be printed in "landscape".) (Note: full printouts of the "Monitor" reports are shown in FIG. 11 and FIG. 12.)

To Download to Excel: Choose the Excel option and "Download".

C. Pending Claims Administration Report (Sorted by Claim File Deadline Date) and Pending Claims Administration Report (Sorted by Company)

What Are These Reports: These reports monitor the status of Nirvana's securities class action claims in cases settled from (DATE) forward (in both passive cases and those in which Nirvana may choose to take a more active role). It is an excellent tool for Nirvana and its Board to insure that it is complying with its fiduciary duty to collect all claims to which it is entitled. Cases listed on this report include both those cases in which Nirvana suffered a loss during the class period and those cases in which Nirvana could potentially have a claim (if part of the class period precedes the data baseline, further investigation needs to be made prior to the claim filing deadline). As notice of recovery is received by BR&B from your custodial bank, the case (and the amount received) will be moved from this report to the Claims Recovery Report.

Terms—Claim Status:

| Abbreviation | Description |
| --- | --- |
| CF | Claim Filed |
| RR | Recovery Received |
| CLINV | Client Investigation Required |
| CUSTCF | Custodian Filed Claim |
| N/A | Not Applicable |
| NC | No Claim Per Plan of Allocation |
| CFNR | Claim Filed/Ineligible |
| NCF | No Claim on File |
| TBF | Claim To Be Filed |
| TBV | Claim To Be Verified with Settlement Administrator |

This is How it Works: When a securities class action case is settled and settlement has been approved by the Court, BR&B will determine whether Nirvana has or may have suffered a loss in connection with the case. If Nirvana has suffered a loss in a settled case for which it may receive compensation, the case will appear on the Pending Claims Administration Report. Once a recovery has been received (and BR&B has been notified of the amount received) or it has been determined that Nirvana is not eligible to participate in the claims recovery for the case, the case will be removed from this report.

Listed on this report is the following information for each case: Company/Case Name; Ticker; Cusip/ISIN; Class Begin Date; Class End Date; Claim Deadline Date; Claims Administrator; Date Claim Filed; Claim Status; Trade Status; Estimated Market Loss; Eligible Loss.

Figure 13:
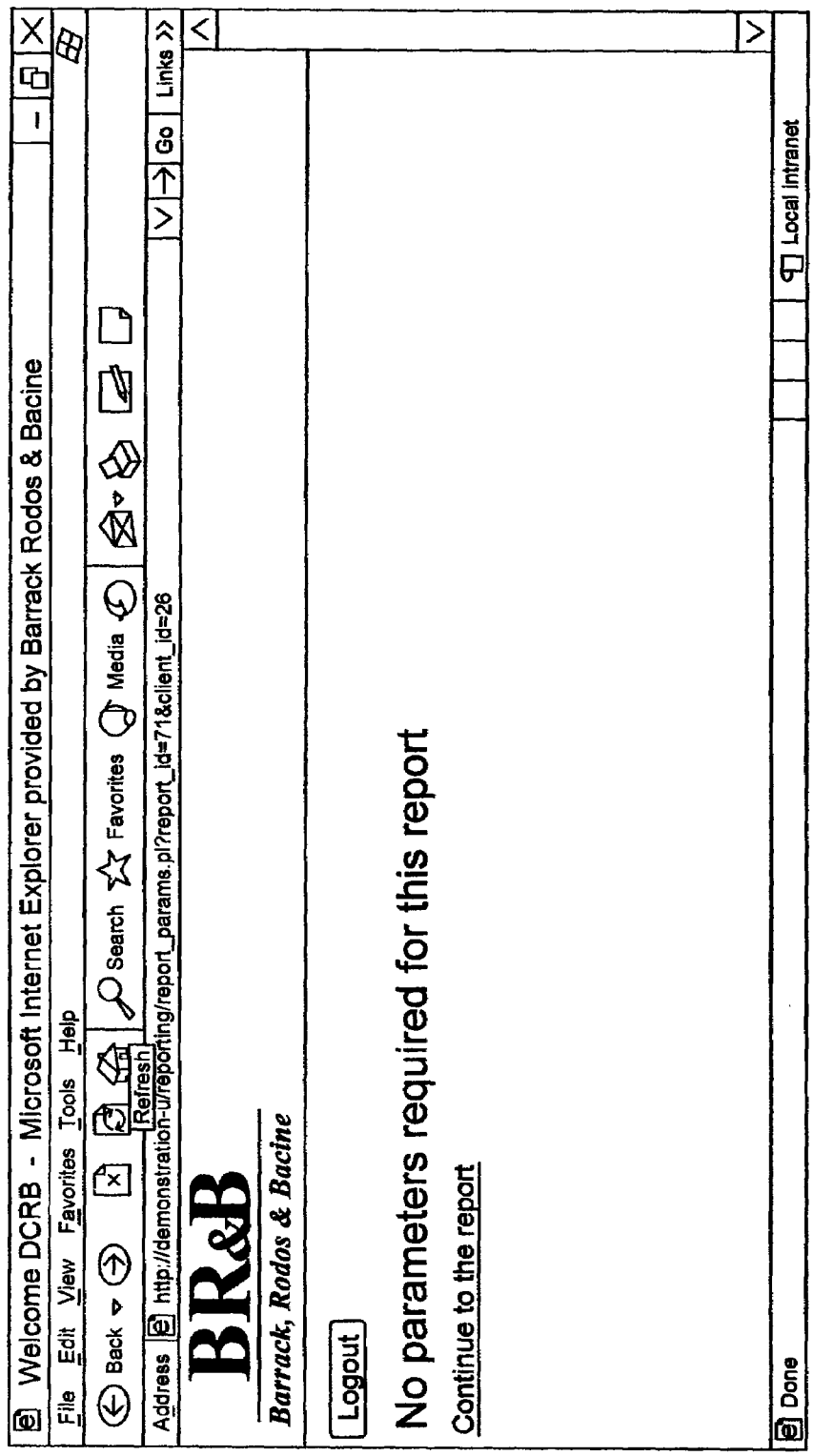

How to Run The "Claims Administration" Reports: When you click on the report name, a screen, pictured in FIG. 13, is displayed:

Click on "Continue to the report"

Special Note: The Claims Administration reports are NOT date generated reports. Settled cases in which Nirvana is eligible or may be eligible to receive a recovery will be displayed on this report. Once a recovery is received by Nirvana, and BR&B has been notified of receipt, that particular case will be moved to the Recovery Reports.

The report will appear on your screen as pictured in FIG. 14.

You may: (a) view this entire report on the web; (b) print the report; (c) download the report to an Excel spreadsheet; or (d) search for a particular item.

Search Feature: You may enter the name of any company, ticker symbol, cusip number in the search box field, and a window will be displayed with the search results.

To Print this Report: Select "Printer-Friendly" above and "Download". The Report will be displayed as pictured in FIG. 15. Choose File and Print (remember that all reports should be printed in "landscape".) (Note: full printouts of the "Claims Administration" reports are shown in FIGS. 16 and 17.)

To Download to Excel: Choose the Excel option and "Download".

D. Claims Recovery Report (Sorted Claim File Date) and Claims Recovery Report (Sorted by Case Name)

What Are These Reports: These reports will list proceeds received by Nirvana per Nirvana's custodial information provided to BR&B.

This is How it Works: When BR&B has been notified that Nirvana has received notice of a recovery check from a claims administrator representing Nirvana's pro rata share of a settlement fund, (which was the result of a claim filed by your custodial bank) BR&B will keep track of these recoveries received by date of recovery with the amount of each recovery.

Listed on this report is the following information for each case: Company/Case Name; Ticker; Cusip/ISIN; Claims Administrator; Recovery Forward Date; Recovery Amount Received; Estimated Market Loss; Eligible Loss.

Figure 18:
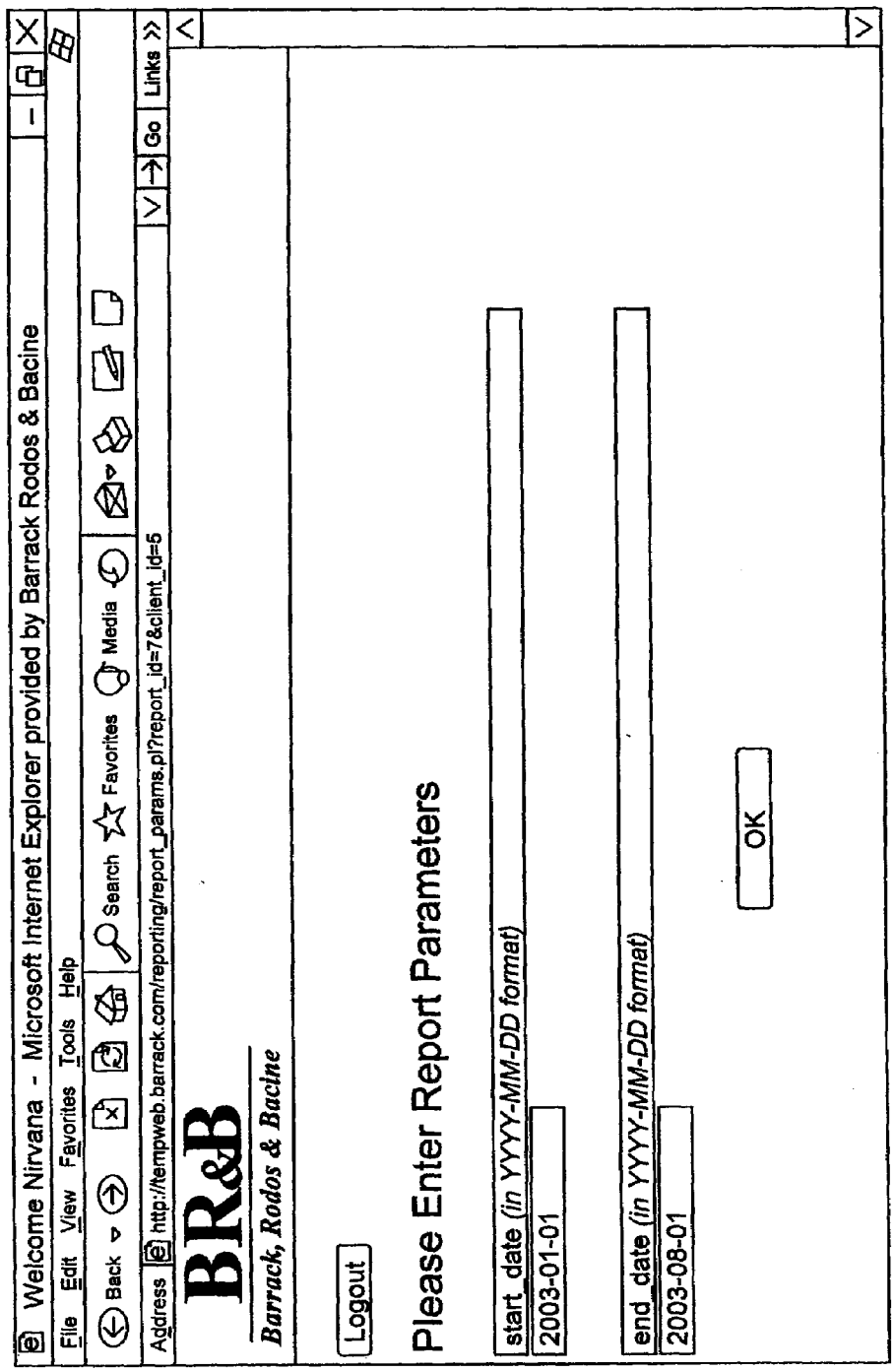

How to Run The "Recovery" Reports: When you click on the report name, a screen, pictured in FIG. 18, is displayed.

"Start Date"—"End Date" boxes—require dates. The dates that you are being prompted to enter are the Recovery Forward Dates. For example, you may want to see all recoveries that BR&B has recorded for Nirvana for the time period of Jan. 1, 2003 through Aug. 1, 2003. The dates should be entered as displayed above. Click OK.

Figure 19:
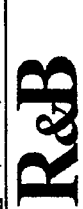

The Report will appear on your screen as pictured on FIG. 19.

You may: (a) view this entire report on the web; (b) print the report; (c) download the report to an Excel spreadsheet; or (d) search for a particular item.

Search Feature: You may enter the name of any company, ticker symbol, cusip number in the search box field, and a window will be displayed with the search results.

To Print this Report: Select "Printer-Friendly" above and "Download". The Report will be displayed as pictured on FIG. 20. Choose File and Print (remember that all reports should be printed in "landscape".) (Note: full printouts of the "Recovery" reports are shown on FIGS. 21 and 22.)

To Download to Excel: Choose the Excel option and "Download".

Note: The recovery information listed on the sample/draft Claims Recovery reports attached hereto contain claims recovery information that Nirvana and/or its custodial bank has furnished to BR&B.

End of Instruction Manual

FIG. 23 shows another example of an Activity Filings Report (all inclusive, by company) for a second client.

FIGS. 24–31 shows a full set of reports similar to those shown in FIGS. 6–7, 11–12, 16–17 and 21–22 for a third client.

To illustrate the feature wherein potential market losses are identified, the Class Action Activity Filings Reports show a disproportionate percentage of lawsuits where the financial entity has a potential market loss. For a typical financial entity, most of the entries in this report would show a trade status of NACT (no activity), and thus no estimated market loss.

II. Description of Barrack Rodos & Bacine's Proprietary Database and Reporting System for the Embodiment of the Present Invention Described Above.

1. Platform a. The platforms used in the Barrack Rodos & Bacine reporting system are: Windows NT/2000/XP, Microsoft SQL Server and Microsoft Internet Information Server (IIS).

b. Programming languages are Transact-SQL, Perl, XML and XSLT.

2. User Authentication a. Users (Clients)

i. A user visits the site and is redirected to a login page. The user enters username and password, which is compared to information in the database. If the user logs in correctly, the system creates a session ID in the database associated with the user, and stores a cookie on the user's browser containing the session id. Subsequent visits during this session are authenticated using this session id.

ii. Users are associated with clients in the database. The system uses this relationship to determine what information to show a user.

iii. The user is taken to the reporting home page, which is customized for each client with a list of available reports relating to securities cases. The user selects a report and is asked to provide any requisite parameters (e.g. a range of dates for the report), and is taken to the report itself. The user can also choose to download the report as a spreadsheet or view the report in a printable format. Since the user is associated with a given client in the database, he or she can only view that client's reports.

iv. Reports access the "transactions", "claim_file_dates", "claim_stats" and "claims_admin" tables in the database. Each report uses a unique client indentifier to identify information for a particular client.

b. Users (Administrators)

i. An administrative user has the same login and session maintenance as a client user. However, an administrative user is not associated with a client, but rather is a member of an administrator's group. As a member of this group, an administrator can view any client's reports and can add and edit clients as well as add and edit users.

Figure 32:
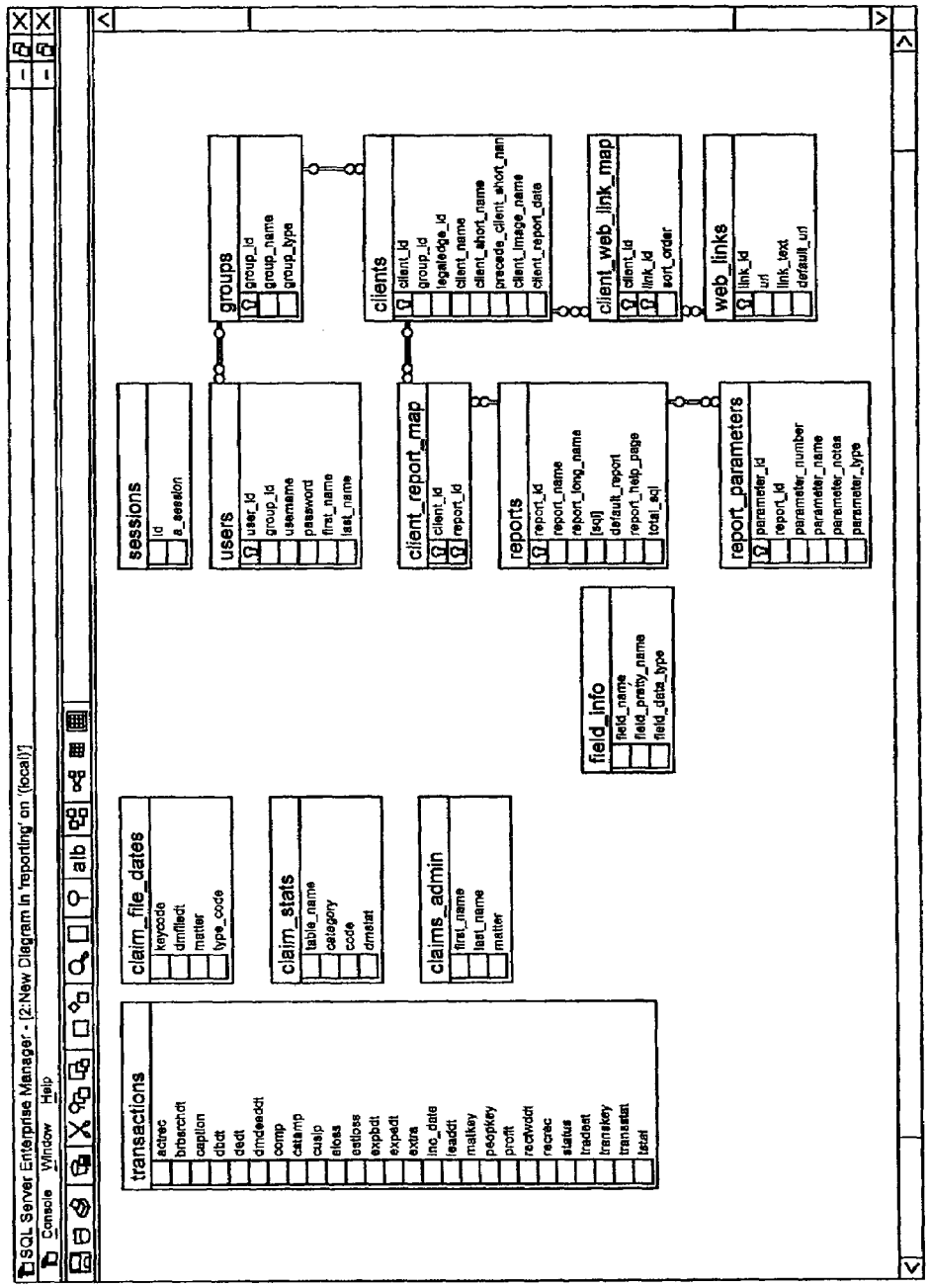
FIG. 32 is a database diagram of the report creation and accessing.

3. Database Diagram—See FIG. 32.

4. Computer code for report generation. The Appendix provides source code associated with the reports for the embodiment of the present invention described above.

The report generating software is periodically executed, such as once every hour, so that the reports are current when accessed by the clients. The reports themselves are static information and are uploaded to a server site for 24 hour client access.

III. Creation and Maintenance of a First Database of Transaction Activity for a Financial Entity The reports of FIGS. 1–22 reflect the transaction activity of the Nirvana Pension Fund. FIG. 33 shows a representation of transaction activity as obtained from the custodial records of the Nirvana Pension Fund. For illustration purposes only, the portfolio of this fund generally purchases a block of shares at the beginning of each year and sells the shares after five years. One exception is the shares of Guidant Corporation which were purchased and sold within a six week period.

The transaction activity correlates with the reports. For example, referring to FIGS. 6 and 33, Nirvana purchased 60,000 shares of Regeneron Pharmaceuticals on Jan. 2, 2003 and the class period for the Regeneron lawsuit is for any purchase from Mar. 28, 2000 to Mar. 30, 2003. Thus, Nirvana had an estimated market loss for this security. Nirvana had no transaction activity for Stellent, Inc. so the report shows no estimated market loss for this record. Likewise, there were no lawsuits filed for Home Depot during the search dates of the report, so there is no entry for Home Depot in the report even though Home Depot stock was purchased during the report period.

In one preferred embodiment of the present invention, the first database of transaction activity for a financial entity is obtained from the custodial records of each financial entity. The custodial records include trade data that allows a determination to be made as to whether a financial transaction falls within the class period for a given lawsuit. The manner in which custodial records are accessed, stored, filtered and maintained will depend upon recordkeeping practices and data storage formats of the custodian and the service provider (here, Barrack, Rodos & Bacine). Each custodian may store and download their custodial data in a different format and may have a different availability of historical data (e.g., one month of data, one year of data). The service provider will typically need to develop and maintain its own database of transaction activity since custodians usually cannot provide historical data for the financial entities, especially in immediate downloadable electronic form. Thus, the service provider may need to log onto the custodial records once per month, download the latest month of transaction data, and append it to its own database of past transaction data for the financial entity. In this manner, the service provider will always have a full set of transaction data for the financial entity. Thus, if five years from now, a lawsuit is filed for a class period that covers 2003, the service provider will already have the transaction activity for 2003 in its database. If a custodial bank always allows access to a complete historical database of transaction activity, then it may not be necessary to perform the piecemeal downloading and appending process to build the database of historical data.

Custodians provide transactional data in unpredictable and inconsistent formats. Accordingly, data must be retrieved and converted (parsed) into a unified format and the converted data placed into a common repository. The service provider uses the converted data to determine, for any given security, the client's holdings through a range of dates, detailed information about each transaction in the subject security, and the client's losses on those transactions, if any, during a specified time period.

Some custodial banks and their related websites that provide electronic access to custodial records of a financial entity are listed below:

State Street Bank: In-Sight On-line System (https://www.iisonline.statestreet.com/)

Bank of New York: INFORM (https://inform.bankofny.com)

Northern Trust: (http://www.northerntrust.com/)

The process for logging into these password-protected sites, accessing and searching the custodial records, and downloading the records is well-known and thus is not described further.

Figure 34:
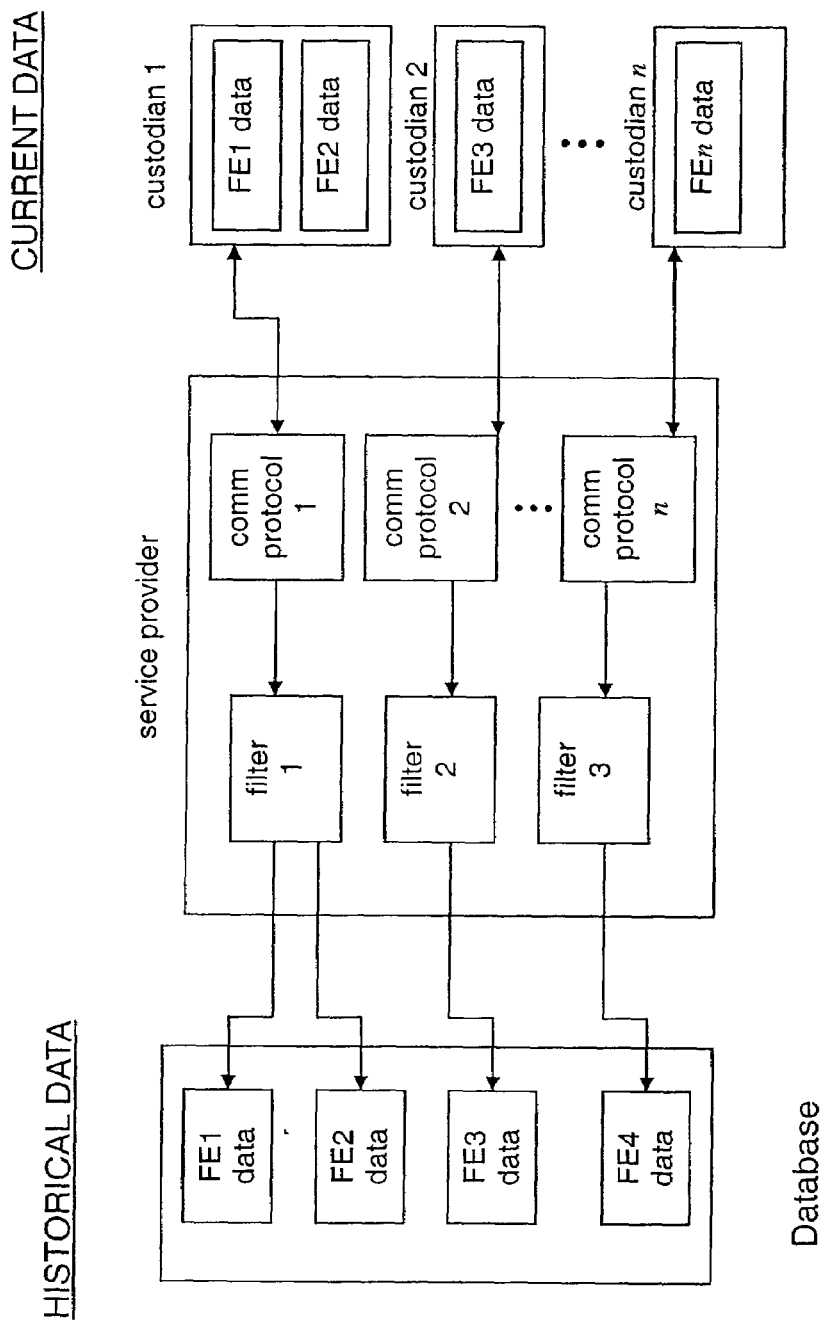
FIG. 34 is a schematic diagram of the custodial record retrieval and storage process.
Figure 35:
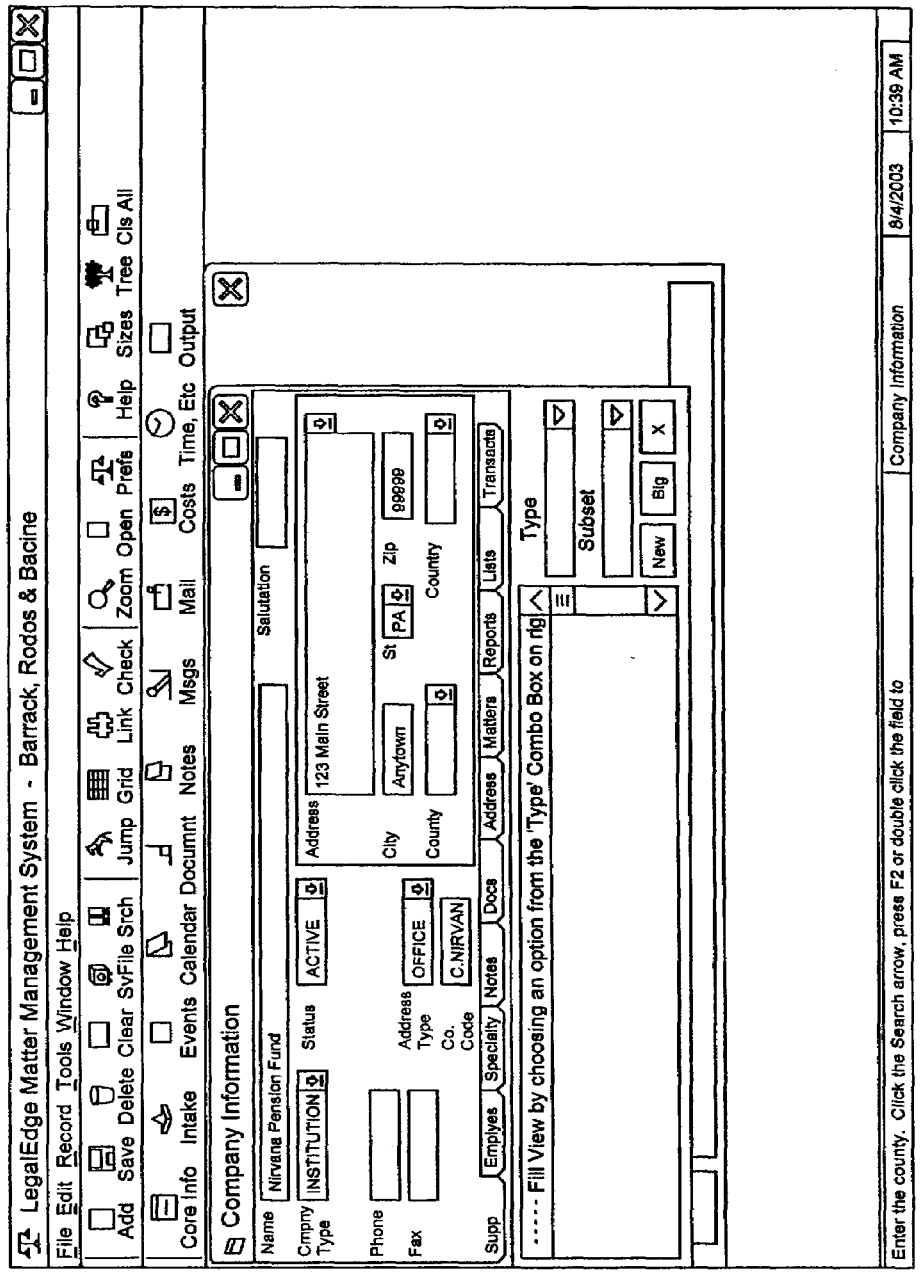
Figure 37:
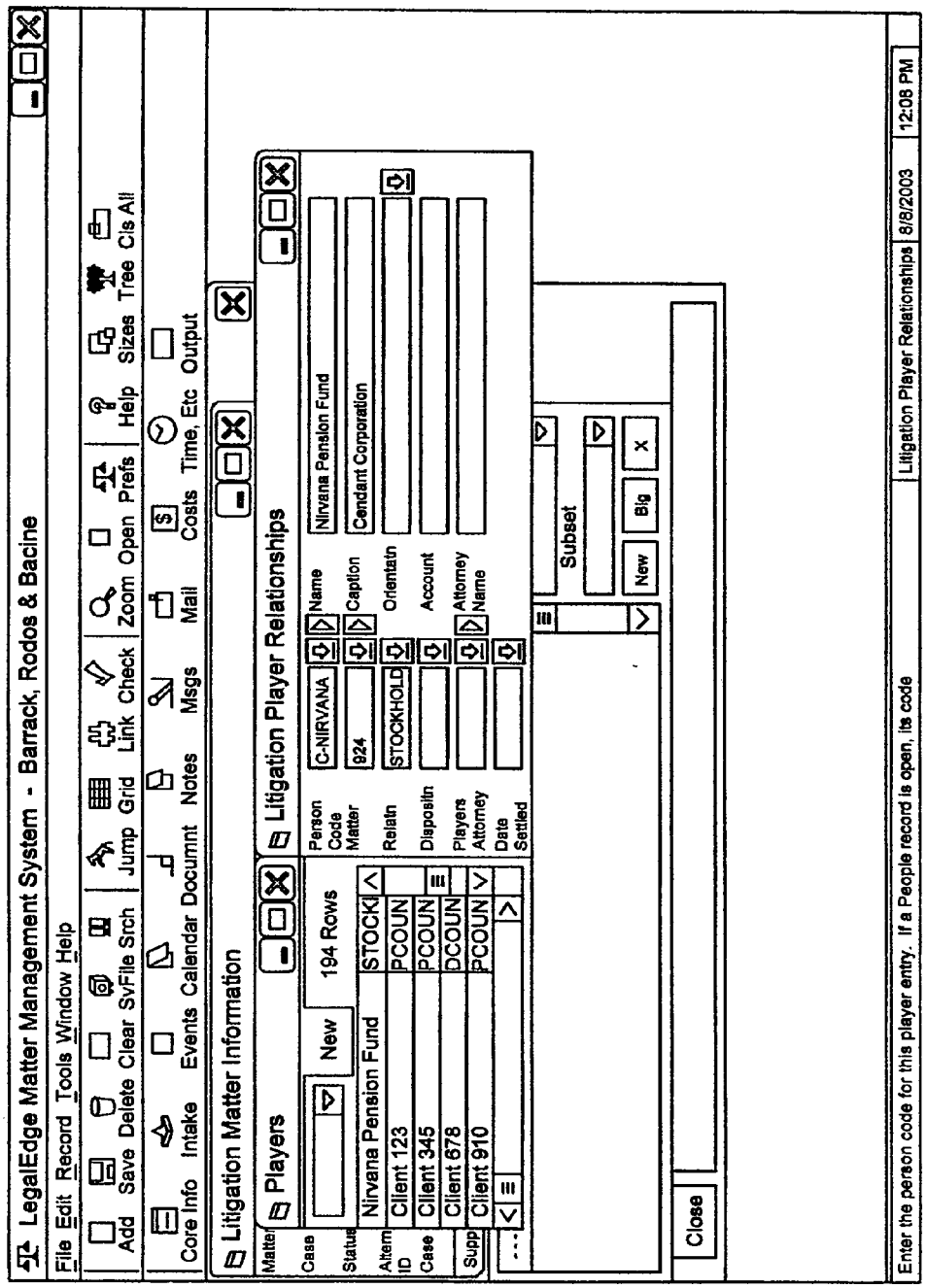

FIG. 34 is a schematic diagram of the custodial record retrieval and storage process. The service provider communicates with each custodian using the appropriate communication protocol to obtain the latest transaction activity and filters the data accordingly using a parsing engine or the like. In this example, two different financial entities are located at the same custodian 1. The filtered data is then stored in historical databases for each financial entity.

Some custodial banks do not allow custodial records to be electronically downloaded, but the custodial records can be printed out. Other banks may not even allow for electronic access to such records, but will provide periodic statements to their customers. For such banks, the printed records can be scanned into a database and filtered to be placed in the standardized format necessary for storage in the database shown in FIG. 34.

As discussed above, each custodial bank has a different log-in process. If the system is deployed for a large number of clients, then there will likely be a large number of custodial banks. To avoid the time-consuming process of logging into each of the custodial bank, scripts are preferably written for each custodial bank so that the log-in and record accessing process can be automated.

IV. Creation and Maintenance of Second Database of Securities Class Action Lawsuits Many databases exist that contain securities class action lawsuits. One publicly accessible database is the Index of Filings maintained by the Stanford Law School Securities Class Action Clearinghouse, in cooperation with Cornerstone Research. This database is accessible at the following website: http://securities.stanford.edu/companies.html. Any such database may be used as the second database of the present invention. In one preferred embodiment of the present invention described in the previous figures, a proprietary database is created and maintained using a semi-customized commercially available legal matter management system from LegalEdge™ Software, Wayne, Pa. The software is also used for tracking client data. Specifically, if a financial entity has a potential monetary claim, the software is used to store the information associated with the claim that is shown in the reports above (e.g., estimated market loss, eligible loss, recovery received)

FIGS. 35–39 show sample input screens for entering the lawsuits and tracking client data. FIGS. 36–39 show information for the Cendant Corporation lawsuit that appears in the reports.

The Private Securities Litigation Reform Act (PSLRA) of 1995 includes a notice provision that reads, in part, as follows:

Not later than 20 days after the date on which the complaint is filed, the plaintiff or plaintiffs shall cause to be published, in a widely circulated national business-oriented publication or wire service, a notice advising members of the purported plaintiff class—

(I) of the pendency of the action, the claims asserted therein, and the purported class period; and (II) that, not later than 60 days after the date on which the notice is published, any member of the purported class may move the court to serve as lead plaintiff of the purported class.

These notices are thus readily available from a wide variety of electronic media sources and can be located almost immediately on a daily basis. For example, a daily search on Yahoo Advanced News using key words that typically appear in such notices can be run to locate the lawsuits. Newspapers such as the New York Times, USA Today and Investor's Business Daily can also be monitored for such notices. Settlements notices are also posted in these sources. Once a new lawsuit is identified or a status change of existing lawsuit is identified (e.g., change in class period, settlement announcement), then the second database (here, the LegalEdge database) must be updated accordingly.

V. Estimated Market Loss Calculation

Figure 38:
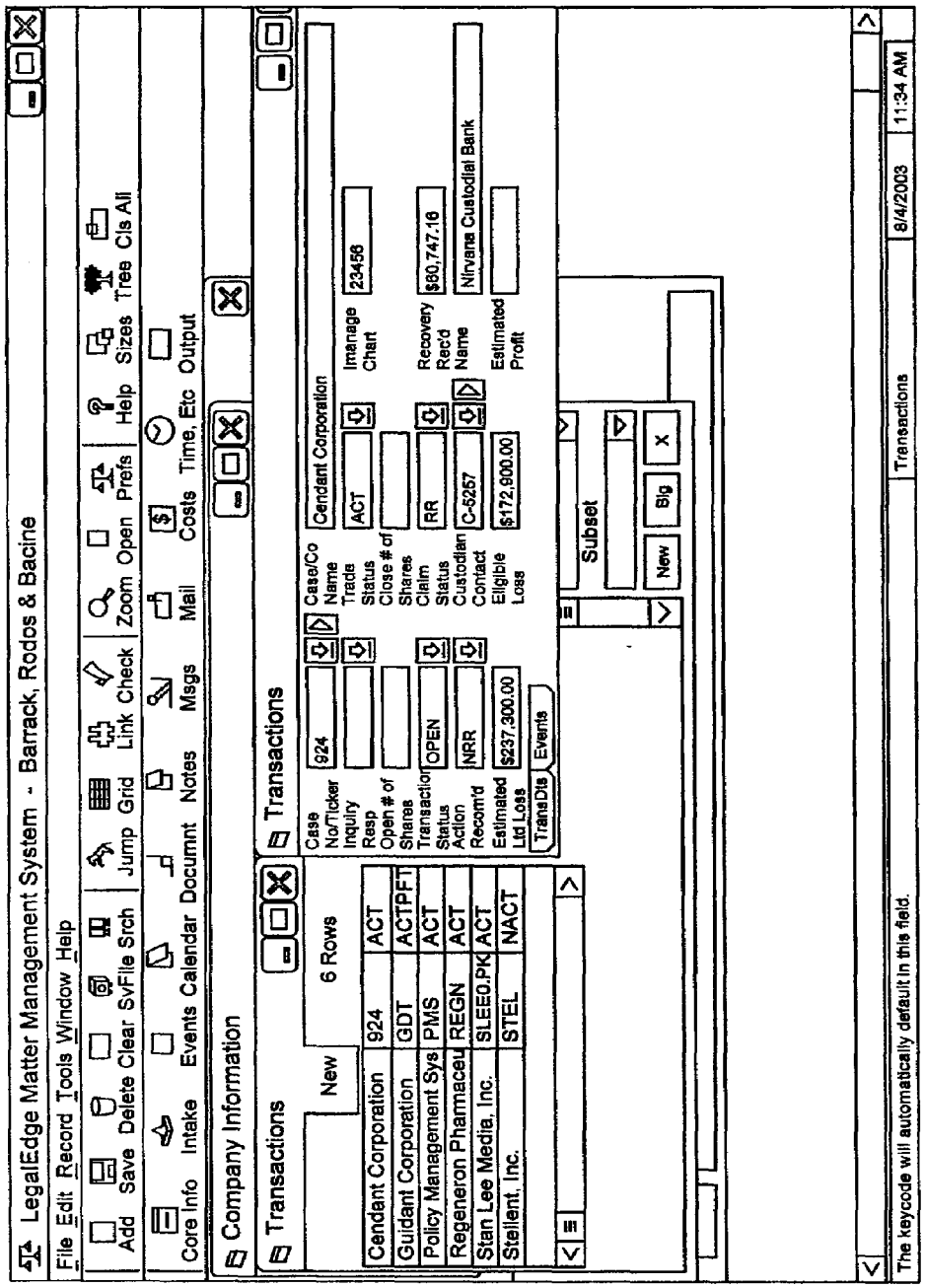

If a potential monetary claim is identified for a financial entity based on a newly entered lawsuit, then an estimated market loss calculation is performed. The result is entered into the Transactions window of LegalEdge, as shown in FIG. 38.

One method of calculating the estimated market loss is the "first-in/first-out (FIFO) method as described below:

i. Background

Plaintiffs in securities class action lawsuits are required to sign a Certification which includes a listing of all purchases and sales of securities of the named defendant company during the stated Class Period. For each purchase or sale, the trade date, number of shares, and price per shares are listed. Under the law, it is the actual price paid or received that must be used and not an "average" price and only shares purchased during the class period are allowed to obtain recovery. To compute the loss for shares purchased in the Class Period, generally speaking, sale proceeds from shares purchased during the period are subtracted from the cost of those shares and the "retained value" is subtracted from the purchase price of shares purchased and retained during the class period. The "retained value" is the average of the closing prices for the 90 day period following the end of the Class Period (15 U.S.C. § 78u-4(e)).

ii. "FIFO" Method

To precisely compute the loss for shares sold during the class period, it is necessary to match each share sold with a prior purchase. As it is generally impractical to search for the actual stock certificate numbers connected with each purchase and sale—particularly when dealing with the volume of transactions typical of an institution seeking to serve as lead plaintiff—courts have generally recognized the "first-in, first-out" accounting method to match class period sales to prior purchases and calculate loss. The first-in, first-out, or "FIFO" method, assumes that the earliest acquired shares are sold first. No loss or gain is computed on shares purchased before the class period even if the shares are sold in the class period, because the law only permits calculations of gain or losses for those shares purchased in the class period. Thus, shares sold during the class period are first matched to the "prior balance" of shares purchased prior to the class period.

iii. Examples

The class period of the lawsuit is Feb. 1, 2000 through and including Aug. 4, 2000. The transaction records indicate that the investment fund of the client purchased 2000 shares of XYZ company on Mar. 2, 2000 at $100/share and sold those same shares on May 29, 2000 at $50/share. One-half of the initial investment has been lost, as shown on the chart in FIG. 40. However, if the fund had a beginning balance on Feb. 1, 2000 of 100,000 shares, then the above 2000 shares sold would not be matched against the 2000 shares purchased on Mar. 2, 2000, but would be matched against the beginning balance of 100,000 shares. If the stock continued to decline to a retained value of $20.00 at the end of the class period, the loss would be $160,000, as shown on the chart in FIG. 41.

The estimated market loss calculation may be manually calculated or may be automatically calculated based on preprogrammed algorithms. In either instance, it is preferable to use a spreadsheet for the calculation, such as an Excel spreadsheet. In one preferred embodiment of the present invention, a link is provided on the reports shown in FIGS. 5, 10, 15 and 20 which allows the client to access and view the spreadsheet. The link is not shown in these figures, but is preferably provided adjacent to each estimated market loss value.

VI. Eligible Loss Calculation

If or when a lawsuit settles for which an estimated loss value exists, then an eligible loss calculation is performed. The result is entered into the Transactions window of LegalEdge, as shown in FIG. 38.

The eligible loss is determined using the formulas contained in the Plan of Allocation, developed by experts hired by plaintiffs' counsel in a securities class action and are unique to the class action in question. The formulas, which differ for each securities class action are completely out of the control of the claimants in that action (although class members can and sometimes do object to a Plan of Allocation before a court gives final approval to the settlement and allocation).

In the Cendant case, the Nirvana Pension Fund purchased 70,000 shares of CUC Corp. (the predecessor to Cendant) on Jan. 2, 1996 at $23.00 per share & sold those shares on Dec. 31, 2001 at $19.61 per share, as shown in FIG. 33.

Nirvana's eligible loss for Cendant is calculated as follows:

In accordance with the Plan of Allocation approved by the Court and described in detail in the Notice of Settlement of Class Action issued at the direction of the Court on Apr. 7, 2000, for CUC shares purchased between May 31, 1995 and Aug. 28, 1998, that were still held as of Aug. 28, 1998, the Loss Amount is the per share amount indicated in Table A attached to the Plan of Allocation for the date that share was purchased. The Loss Amount for Jan. 2, 1996 is $2.47. Thus, Nirvana's eligible loss is 70,000×$2.47 or $172,900.

The eligible loss calculation may be manually calculated or may be automatically calculated based on preprogrammed algorithms. In either instance, it is preferable to use a spreadsheet for the calculation, such as an Excel spreadsheet. In one preferred embodiment of the present invention, a link is provided on the reports shown in FIGS. 15 and 20 which allows the client to access and view the spreadsheet. The link is not shown in these figures, but is preferably provided adjacent to each estimated market loss value.

VII. Additional Disclosure

The present invention may be implemented in a variety of different ways. In the embodiment of the invention described above, the service provider maintains historical transaction data for a plurality of financial entities and is provided access to new transaction data. Likewise, a second database of lawsuits is maintained. Whenever any new lawsuits are added to the second database or if the record for a lawsuit already existing in the database is modified or updated (such as by changing the class period), the transaction activity for each financial entity is reviewed to identify any securities purchased or acquired by each financial entity that are associated with the securities class action lawsuit and which may provide a potential monetary claim for the respective financial entity. If a settlement is announced in a lawsuit that exists in the database, eligible loss calculations are automatically or manually performed for all estimated loss entries.

If a new financial entity (client) is added to the system, there will be an agreement between the client and the service provider regarding how far back in time the transaction activity will be checked. This will depend upon the availability of the transaction records and other practical considerations. Initially, all of the transaction activity will be checked against every lawsuit in the second database. Thereafter, only new or modified lawsuit records will need to be checked.

In an alternative embodiment of the invention, the report module is not necessarily used. Instead, the following steps are performed:

1. A database of transaction activity is accessed for one or more financial entities. The transaction activity includes for each financial entity, an identification of each security purchased or acquired; and the date of each purchase or acquisition.

2. A database of a plurality of securities class action lawsuits is accessed. The database includes for each lawsuit an identification of all securities associated with the class action lawsuit, and the class period of the lawsuit.

3. The transaction activity of the one or more financial entities is automatically compared with the database of the securities class action lawsuit.

4. Any securities purchased or acquired by each financial entity during the class period that are associated with a securities class action lawsuit are identified. The identified securities may provide a potential monetary claim for the respective financial entity.

This alternative embodiment may be used for a financial entity that may not wish to subscribe to a service that can provide up-to-date reports and follow-up monitoring of relevant lawsuits. Such a financial entity may upload its own trading records if no automated custodial bank access can be facilitated or if no custodial records are readily available. The financial entity may receive a report of any potentially relevant lawsuits, but no permanent, retrievable report records will be established or maintained at the service provider for the financial entity.

The volume of data in the system (both transaction records and lawsuits), the speed of the system computers, and other practical considerations will determine how frequently and how thoroughly comparisons are done between transaction records and lawsuit records. Notwithstanding these factors, the searches are always redone if the class period of a previously entered lawsuit changes. This typically occurs upon settlement when the class period is often narrowed. If no changes are made to the class period or settlement status of a particular lawsuit, then it is typically not necessary to rerun a search of the security associated with the lawsuit against the transaction activity of a financial entity because no new reportable information would be identified. That is, if new transaction activity is added for the financial entity, then it is not likely that the new activity would result in an estimated market loss since the class period for the lawsuit would always be a time period prior to the new transaction activity.

To select the appropriate "Action Recommended" terms for entry into the reports, it is typically necessary for a technical expert such as a securities class action attorney an/or an accountant to manually analyze the client's holdings with respect to the claims made in the lawsuit and the total securities holdings of the company subject to the lawsuit. However, some selected actions can be automatically determined based on preprogrammed algorithms. For example, the PSLRA includes a presumption that the lead counsel may be the person who "has the largest financial interest in the relief sought by the class." If the eligible class members of a lawsuit are those who purchased stock during the class period, then an initial recommendation can be made by automatically determining what percentage of the company's total stock was purchased by the financial entity during the class period. If the percentage is greater than a predetermined value, then lead counsel may be recommended. Alternatively, if the percentage is less than a predetermined value, the action of only monitoring the case may be recommended. If the percentage is extremely low, the action recommended may be automatically selected to be "none." Estimated loss value thresholds may also be used to automatically select these recommendations.

The present invention allows a financial entity to more easily fulfill its fiduciary duty to evaluate its position with respect to any given securities class action lawsuit, and track any identified potential market loss through the conclusion of a lawsuit. The all inclusive Class Action Activity Filing Report is particularly helpful since a financial entity can quickly respond to inquiries as to whether the financial entity has a potential market loss with respect to any particular lawsuit. The Pending Class Action Monitor Report is particularly useful in that it allows a financial entity to get a comprehensive overview of only the lawsuits that provide a potential monetary claim, as well as the estimated market loss. This allows the financial entity to quickly determine which lawsuits to focus attention on, especially if an active role in the lawsuit is recommended.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

We claim:

1. A computer-implemented method of automatically creating reports related to potential monetary claims resulting from securities class action lawsuits for securities purchased or acquired by one or more financial entities, the method comprising, for each financial entity:
   (a) accessing a first database of transaction activity for a financial entity, the transaction activity including:
      (i) an identification of each security purchased or acquired, and
      (ii) the date of each purchase, sale and acquisition;
   (b) accessing a second database of securities class action lawsuits, the second database including pending securities class action lawsuits, the second database including for each lawsuit:
      (i) an identification of all securities associated with the class action lawsuit, and
      (ii) the class period of the lawsuit;
   (c) automatically comparing in a computer the transaction activity of the financial entity with the securities class action lawsuits in the second database;
   (d) identifying any securities purchased or acquired by the financial entity during the class period that are associated with an entered securities class action lawsuit, wherein the identified securities may provide a potential monetary claim for the financial entity; and
   (e) automatically creating a report of at least the lawsuits that may provide a potential monetary claim for the financial entity based on the transaction activity of the financial entity.

2. The method of claim 1 wherein step (d) further comprises identifying any securities that were purchased or acquired by the financial entity during the class period, the method further comprising:
   (f) calculating an estimated market loss for each security that was identified as being purchased or acquired by the financial entity during the class period, the report including the estimated market loss values.

3. The method of claim 2 further comprising:
   (g) upon settlement of a lawsuit, calculating an eligible loss for each security that has an estimated market loss value.

4. The method of claim 3 wherein a calculation is performed to determine the eligible loss to the financial entity, the method further comprising:
   (g) entering the calculation result into a spreadsheet;
   (h) storing the spreadsheet in a retrievable file; and
   (i) accessing the spreadsheet while viewing the report.

5. The method of claim 2 wherein a calculation is performed to determine the estimated market loss to the financial entity, the method further comprising:
   (g) entering the calculation result into a spreadsheet;
   (h) storing the spreadsheet in a retrievable file; and
   (i) accessing the spreadsheet while viewing the report.

6. The method of claim 1 further comprising:
   (f) entering the securities class action lawsuits into the second database and periodically updating the second database of securities class action lawsuits with newly filed unsettled lawsuits, and repeating steps (c) and (d) after each update for the newly filed lawsuits, the reports therefore automatically including the newly filed unsettled lawsuits that may provide a potential monetary claim for the financial entity based on the transaction activity of the financial entity.

7. The method of claim 6 further comprising:
   (f) monitoring statutorily required public notices of newly filed securities class action lawsuits, wherein the lawsuits in the second database are entered immediately upon identifying any such newly filed lawsuits.

8. The method of claim 1 wherein the lawsuits in the report include all lawsuits in the second database, including any lawsuits that do not provide a potential monetary claim for the financial entity based on the transaction activity of the financial entity.

9. The method of claim 1 further comprising:
(f) accessing custodial records of the financial entity to obtain the transaction activity for the financial entity and populating the first database with the transaction activity.

10. A computer-implemented method of automatically identifying potential monetary claims resulting from securities class action lawsuits, the method comprising:
(a) accessing a first database of transaction activity for one or more financial entities, the transaction activity including for each financial entity:
  (i) an identification of each security purchased or acquired, and
  (ii) the date of each purchase or acquisition;
(b) accessing a second database of a plurality of securities class action lawsuits, the second database including pending securities class action lawsuits, the second database including for each lawsuit:
  (i) an identification of all securities associated with the class action lawsuit, and
  (ii) the class period of the lawsuit;
(c) automatically comparing in a computer the transaction activity of the one or more financial entities with the securities class action lawsuits; and
(d) identifying any securities purchased or acquired by each financial entity that are associated with a securities class action lawsuit, wherein the identified securities may provide a potential monetary claim for the respective financial entity.

11. The method of claim 10 wherein step (d) further comprises identifying any securities purchased or acquired by each financial entity during the class period that are associated with a securities class action lawsuit, wherein the identified securities may provide a potential monetary claim for the respective financial entity.

12. The method of claim 11 wherein step (a) is performed by accessing custodial records of the one or more financial entities.

13. An article of manufacture for automatically creating reports related to potential monetary claims resulting from securities class action lawsuits for securities purchased or acquired by one or more financial entities, the article of manufacture comprising a computer-readable medium holding computer-executable instructions for performing a method comprising, for each financial entity:
(a) accessing a first database of transaction activity for a financial entity, the transaction activity including:
  (i) an identification of each security purchased or acquired, and
  (ii) the date of each purchase, sale and acquisition;
(b) accessing a second database of securities class action lawsuits, the second database including pending securities class action lawsuits, the second database including for each lawsuit:
  (i) an identification of all securities associated with the class action lawsuit, and
  (ii) the class period of the lawsuit;
(c) automatically comparing in a computer the transaction activity of the financial entity with the securities class action lawsuits in the second database;
(d) identifying any securities purchased or acquired by the financial entity during the class period that are associated with an entered securities class action lawsuit, wherein the identified securities may provide a potential monetary claim for the financial entity; and (e) automatically creating a report of at least the lawsuits that may provide a potential monetary claim for the financial entity based on the transaction activity of the financial entity.

14. The article of manufacture of claim 13 wherein step (d) further comprises identifying any securities that were purchased or acquired by the financial entity during the class period, and the computer-executable instructions perform a method further comprising:
(f) calculating an estimated market loss for each security that was identified as being purchased or acquired by the financial entity during the class period, the report including the estimated market loss values.

15. The article of manufacture of claim 14 wherein the computer-executable instructions perform a method further comprising:
(g) upon settlement of a lawsuit, calculating an eligible loss for each security that has an estimated market loss value.

16. The article of manufacture of claim 15 wherein a calculation is performed to determine the eligible loss to the financial entity, and the computer-executable instructions perform a method further comprising:
(g) entering the calculation result into a spreadsheet;
(h) storing the spreadsheet in a retrievable file; and
(i) accessing the spreadsheet while viewing the report.

17. The article of manufacture of claim 14 wherein a calculation is performed to determine the estimated market loss to the financial entity, and the computer-executable instructions perform a method further comprising:
(g) entering the calculation result into a spreadsheet;
(h) storing the spreadsheet in a retrievable file; and
(i) accessing the spreadsheet while viewing the report.

18. The article of manufacture of claim 13 wherein the computer-executable instructions perform a method further comprising:
(f) entering the securities class action lawsuits into the second database and periodically updating the second database of securities class action lawsuits with newly filed unsettled lawsuits, and repeating steps (c) and (d) after each update for the newly filed lawsuits, the reports therefore automatically including the newly filed unsettled lawsuits that may provide a potential monetary claim for the financial entity based on the transaction activity of the financial entity.

19. The article of manufacture of claim 18 wherein the computer-executable instructions perform a method further comprising:
(f) monitoring statutorily required public notices of newly filed securities class action lawsuits, wherein the lawsuits in the second database are entered immediately upon identifying any such newly filed lawsuits.

20. The article of manufacture of claim 13 wherein the lawsuits in the report include all lawsuits in the second database, including any lawsuits that do not provide a potential monetary claim for the financial entity based on the transaction activity of the financial entity.

21. The article of manufacture of claim 13 wherein the computer-executable instructions perform a method further comprising:
(f) accessing custodial records of the financial entity to obtain the transaction activity for the financial entity and populating the first database with the transaction activity.

22. An article of manufacture for automatically identifying potential monetary claims resulting from securities class action lawsuits, the article of manufacture comprising a computer-readable medium holding computer-executable instructions for performing a method comprising:

(a) accessing a first database of transaction activity for one or more financial entities, the transaction activity including for each financial entity:
  (i) an identification of each security purchased or acquired, and
  (ii) the date of each purchase or acquisition;
(b) accessing a second database of a plurality of securities class action lawsuits, the second database including pending securities class action lawsuits, the second database including for each lawsuit:
  (i) an identification of all securities associated with the class action lawsuit, and
  (ii) the class period of the lawsuit;
(c) automatically comparing in a computer the transaction activity of the one or more financial entities with the securities class action lawsuits; and
(d) identifying any securities purchased or acquired by each financial entity that are associated with a securities class action lawsuit, wherein the identified securities may provide a potential monetary claim for the respective financial entity.

23. The article of manufacture of claim 22 wherein step (d) further comprises identifying any securities purchased or acquired by each financial entity during the class period that are associated with a securities class action lawsuit, wherein the identified securities may provide a potential monetary claim for the respective financial entity.

24. The article of manufacture of claim 23 wherein step (a) is performed by accessing custodial records of the one or more financial entities.

* * * * *

UNITED STATES PATENT AND TRADEMARK OFFICE
CERTIFICATE OF CORRECTION

PATENT NO. : 7,146,333 B2 Page 1 of 1
APPLICATION NO. : 10/641578
DATED : December 5, 2006
INVENTOR(S) : Patricia A. Hamer et al.

It is certified that error appears in the above-identified patent and that said Letters Patent is hereby corrected as shown below:

Title page, section (56)

The following reference should be added:

-- 2005/0086179 A1   4/2005   Mehmet   705/80 --.

Signed and Sealed this

Eighteenth Day of September, 2007

JON W. DUDAS
*Director of the United States Patent and Trademark Office*